US009438739B2

United States Patent
Mairs et al.

(10) Patent No.: US 9,438,739 B2
(45) Date of Patent: Sep. 6, 2016

(54) METHODS AND APPARATUS FOR TRANSFERRING AN ESTABLISHED COMMUNICATION SESSION IN A TELECOMMUNICATIONS NETWORK

(71) Applicant: Metaswitch Networks Ltd, Enfield (GB)

(72) Inventors: Chris Mairs, Enfield (GB); Alan Cook, San Francisco, CA (US); Jon Rowland, Enfield (GB); Lionel James Jerome Lee, Enfield (GB); Doug Currie, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

(21) Appl. No.: 14/470,758

(22) Filed: Aug. 27, 2014

(65) Prior Publication Data

US 2014/0369484 A1     Dec. 18, 2014

Related U.S. Application Data

(63) Continuation of application No. PCT/GB2013/050476, filed on Feb. 27, 2013.

(60) Provisional application No. 61/603,870, filed on Feb. 27, 2012.

(51) Int. Cl.
*H04M 3/54* (2006.01)
*H04M 3/58* (2006.01)
*H04M 3/42* (2006.01)

(52) U.S. Cl.
CPC ............ *H04M 3/54* (2013.01); *H04M 3/42263* (2013.01); *H04M 3/58* (2013.01)

(58) Field of Classification Search
CPC ...... H04M 3/42263; H04M 3/54; H04M 3/58
USPC .................... 379/211.01, 212.01; 455/417
See application file for complete search history.

(56) References Cited

U.S. PATENT DOCUMENTS 7,106,848 B1      9/2006  Barlow et al.
2006/0177032 A1*  8/2006  Abramson et al. ...... 379/201.01
(Continued)

OTHER PUBLICATIONS iCore "Solutions: Leading Provider of Hosted Unified Communications & Cloud Applications Solutions . . . Voice, Video, Data & Beyond" Accessed on: Aug. 26, 2014; http://www.icore.com/solutions.aspx (2 pages).

(Continued)

*Primary Examiner* — Harry S Hong
(74) *Attorney, Agent, or Firm* — EIP US LLP

(57) ABSTRACT

Measures for transferring an established communication session in a telecommunications network, the communication session being established between one of a plurality of communication clients associated with a user and a remote device associated with a remote party. At a call control system located in the signaling path for the established communication session, a communication session transfer request is received from a device associated with the user, the communication session transfer request having been generated by and transmitted from the device. Transfer of the established communication session from the one communication client in the plurality of communication clients to another communication client in the plurality of communication clients is initiated at the call control system. The transfer is conducted on the basis of a preconfigured data set, specific to the user, identifying one or more of the plurality of communication clients associated with the user.

57 Claims, 17 Drawing Sheets

(56) References Cited

U.S. PATENT DOCUMENTS

| | | |
|---|---|---|
| 2007/0282990 A1 | 12/2007 | Kumar et al. |
| 2008/0056475 A1 | 3/2008 | Brannick et al. |
| 2009/0097628 A1* | 4/2009 | Yap et al. ............... 379/202.01 |
| 2011/0122864 A1* | 5/2011 | Cherifi et al. ............... 370/352 |
| 2014/0079203 A1* | 3/2014 | Drysdale et al. ........ 379/207.02 |

OTHER PUBLICATIONS

International Search Report and Written Opinion issued in corresponding application No. PCT/GB2013/050476 on May 22, 2013.

* cited by examiner

METHODS AND APPARATUS FOR TRANSFERRING AN ESTABLISHED COMMUNICATION SESSION IN A TELECOMMUNICATIONS NETWORK

CROSS-REFERENCE TO RELATED APPLICATIONS

This application is a continuation under 35 U.S.C. §120 of International Application No. PCT/GB2013/050476, filed Feb. 27, 2013 (published by the International Bureau as International Publication No. WO 2013/128178 on Sep. 6, 2013), which claims priority to U.S. Provisional Patent Application No. 61/603,870, filed Feb. 27, 2012. The entire contents of each of the above-referenced applications are hereby incorporated by reference.

BACKGROUND OF THE INVENTION

1. Field of the Invention

The present disclosure relates to transfer of communication sessions. In particular, but not exclusively, the present disclosure relates to transfer of a communication session established between one of a plurality of communication clients associated with a user and a remote device associated with a remote party in a telecommunications network.

2. Description of the Related Technology

Telephony users have long had to deal with a proliferation of user devices (sometimes referred to as 'user equipment' or 'endpoints') through which third parties may contact them. For example, a user might have a fixed-line (or 'wireline') telephony user device for use at home, a further fixed-line telephony user device for use in the office, and a mobile telephony user device for use whilst on the move. Each type of telephony device has associated advantages; whilst a mobile telephony device provides the user with mobility, a fixed-line telephony device typically provides more reliable and higher quality communications and no battery recharge concerns.

Users may also have a number of different access technologies available through which their telephony user devices may conduct communications. For example, a telephony user device may be equipped with a circuit-switched communication interface and one or more circuit-switched communication clients for conducting communications via suitable circuit-switched networks. Likewise, a telephony user device may also/alternatively be equipped with a packet-switched communication interface and one or more packet-switched communication clients for communicating via suitable packet-switched networks.

A circuit-switched telephony device may comprise a fixed-line Plain Old Telephone Service (POTS) telephone equipped with a circuit-switched interface and communication client for conducting communications via a Public Switched Telephone Network (PSTN). A circuit-switched telephony user device may comprise a mobile (or 'cellular') telephone equipped with a wireless circuit-switched interface and communication client for conducting communications via a cellular network such as a Global System for Mobile Communications (GSM) network or Code Division Multiple Access (CDMA) network.

More recently, packet-switched telephony devices have proliferated which may take the form of a fixed-line Internet Protocol (IP) telephone equipped with a fixed-line packet-switched interface and communication client for communicating via an IP network, such as the internet or an IP Private Branch Exchange (IP-PBX). Similarly, a user may conduct communications via a personal computer (PC) equipped with a packet-switched communication client for conducting communications over the internet via a fixed-line internet connection. A mobile packet-switched telephony device may take the form of a portable computing device, such as a laptop or tablet, equipped with a wireless packet-switched interface and communication client for communicating via an IP network, such as the internet, using a Wi-Fi™ or Bluetooth™ compliant wireless access point. A packet-switched communication client may conduct communications according to an internet telephony protocol, commonly referred to as Voice over Internet Protocol (VoIP), with associated setup and control protocols such as the Session Initiation Protocol (SIP) or H.323.

Increasingly, user devices are available that are equipped with multiple communication interfaces to facilitate communication via multiple access technologies. For example, a modern "smartphone" is typically equipped with a circuit-switched interface for communicating via a cellular network and a packet-switched interface for communicating via the internet. Commonly, a smartphone may be equipped with several packet-switched interfaces, for example, a short-range radio interface, e.g. Wi-Fi™ or Bluetooth™ compliant, and/or or via an interface for communication of packet data through a cellular network, such as $3^{rd}$ Generation Partnership Project (3GPP) Long Term Evolution (LTE), LTE-Advanced (LTE-A), High Speed Packet Access (HSPA), Wideband Code Division Multiple Access (W-CDMA) or Mobile WiMax etc. In such cases, a packet-switched communication client may also be deployed for conducting communications via one or more of the available wireless packet-switched interfaces. In cases such as this where a device is equipped with more than one communication client, the various clients deployed in that device are referred to as co-located. A suitable packet-switched communication client may be deployed on a user equipment prior to sale, or could be deployed subsequently through an application distribution portal such as the Apple® App Store™ or Android™ Market etc.

To avoid confusing calling parties with identifiers such as telephone dialing numbers for each of the various communication clients of a user, a one-telephone dialing number telephony service allows the user to publish a single telephone dialing number on which they can be contacted. Thus, when the single telephone dialing number is called, all of the user's communication clients will ring, preferably simultaneously. The user is then able to answer the call at a telephony user device of his choosing, via an access technology of his choosing.

When a user is conducting a call on telephony user device, the user may wish to transfer (or 'jump' or 'switch') the call to another device. Known call transfer systems employ a call 'push' technique where a user initiates the call transfer jump from within a call they are currently conducting on one of their devices. Some such known techniques require a user firstly to enter in a number of digits on their device for activating the call transfer, for example entering digits of a 'star code', and secondly to enter in digits for the telephone dialing number for the device the call is to be transferred to.

Such known call transfer techniques provide poor user experience as the user is required to remember the appropriate code to invoke the call transfer and also the telephone number of the target device the call is to be transferred to. Further, the call transfer process is cumbersome because a significant number of button presses are required by the user to complete the call transfer operation. Still further, input of digits by a user causes in-band transmittal of tones, for example Dual-Tone Multi-Frequency (DTMF) signaling, which may disrupt the flow of media associated with communication session.

It would therefore be desirable to provide improved call transfer services.

SUMMARY

In accordance with first embodiments, there is a method of transferring an established communication session in a telecommunications network, the communication session may be established between one of a plurality of communication clients associated with a user and a remote device associated with a remote party, the method may comprise, at a call control system located in the signaling path for the established communication session:

receiving, from a device associated with the user, a communication session transfer request, the communication session transfer request having been generated by and transmitted from the device; and initiating transfer of the established communication session from the one communication client in the plurality of communication clients to another communication client in the plurality of communication clients, the transfer may be conducted on the basis of a preconfigured data set, specific to the user, identifying one or more of the plurality of communication clients associated with the user.

In accordance with second embodiments, there is apparatus for use in transferring an established communication session in a telecommunications network, the communication session may be established between one of a plurality of communication clients associated with a user and a remote device associated with a remote party, the apparatus may comprise a processing system adapted to, at a call control system located in the signaling path for the established communication session:

receive, from a device associated with the user, a communication session transfer request, the communication session transfer request having been generated by and transmitted from the device; and initiate transfer of the established communication session from the one communication client in the plurality of communication clients to another communication client in the plurality of communication clients, the transfer may be conducted on the basis of a preconfigured data set, specific to the user, identifying one or more of the plurality of communication clients associated with the user.

In accordance with third embodiments, there is computer software adapted to perform a method of transferring an established communication session in a telecommunications network, the communication session may be established between one of a plurality of communication clients associated with a user and a remote device associated with a remote party, the method may comprise, at a call control system located in the signaling path for the established communication session:

receive, from a device associated with the user, a communication session transfer request, the communication session transfer request having been generated by and transmitted from the device; and initiate transfer of the established communication session from the one communication client in the plurality of communication clients to an another communication client in the plurality of communication clients, the transfer may be conducted on the basis of a preconfigured data set, specific to the user, identifying one or more of the plurality of communication clients associated with the user.

In accordance with embodiments, there is a computer program product comprising a (non-transitory) computer-readable storage medium having computer readable instructions stored thereon, the computer readable instructions may be executable by a computerized device to cause the computerized device to perform a method of transferring an established communication session in a telecommunications network, the communication session may be established between one of a plurality of communication clients associated with a user and a remote device associated with a remote party, the method may comprise, at a call control system located in the signaling path for the established communication session:

receive, from a device associated with the user, a communication session transfer request, the communication session transfer request having been generated by and transmitted from the device; and initiate transfer of the established communication session from the one communication client in the plurality of communication clients to an another communication client in the plurality of communication clients, the transfer may be conducted on the basis of a preconfigured data set, specific to the user, identifying one or more of the plurality of communication clients associated with the user.

In accordance with fourth embodiments, there is a method of transferring an established communication session in a telecommunications network, the communication session may be established between one of a plurality of communication clients associated with a user and a remote device associated with a remote party, the method may comprise, at a device associated with the user:

configuring a user interface on the device to display at least one communication session transfer option to the user;

receiving, via the user interface, user input indicating selection of the displayed at least one communication session transfer option by the user; and transmitting, to a call control system located in the signaling path for the established communication session, a communication session transfer request, the transmitted communication session transfer request may be operable to instruct the call control system to initiate transfer of the established communication session from the one of the communication clients in the plurality to another communication client in the plurality, the transfer may be conducted on the basis of a preconfigured data set, specific to the user, identifying one or more of the plurality of communication clients associated with the user.

In accordance with fifth embodiments, there is apparatus for use in transferring an established communication session in a telecommunications network, the communication session may be established between one of a plurality of communication clients associated with a user and a remote device associated with a remote party, the apparatus may comprise a processing system adapted to, at a device associated with the user:

configure a user interface on the device to display at least one communication session transfer option to the user;

receive, via the user interface, user input indicating selection of the displayed at least one communication session transfer option by the user; and transmit, to a call control system located in the signaling path for the established communication session, a communication session transfer request, the transmitted communication session transfer request may be operable to instruct the call control system to initiate transfer of the established communication session from the one of the communication clients in the plurality to another communication client in the plurality, the transfer may be conducted on the basis of a preconfigured data set, specific to the user, identifying one or more of the plurality of communication clients associated with the user.

In accordance with sixth embodiments, there is computer software adapted to perform a method for transferring an established communication session in a telecommunications network, the communication session may be established between one of a plurality of communication clients associated with a user and a remote device associated with a remote party, the method may comprise, at a device associated with the user:

configuring a user interface on the device to display at least one communication session transfer option to the user;

receiving, via the user interface, user input indicating selection of the displayed at least one communication session transfer option by the user; and transmitting, to a call control system located in the signaling path for the established communication session, a communication session transfer request, the transmitted communication session transfer request may be operable to instruct the call control system to initiate transfer of the established communication session from the one of the communication clients in the plurality to another communication client in the plurality, the transfer may be conducted on the basis of a preconfigured data set, specific to the user, identifying one or more of the plurality of communication clients associated with the user.

In accordance with embodiments, there is a computer program product comprising a (non-transitory) computer-readable storage medium having computer readable instructions stored thereon, the computer readable instructions may be executable by a computerized device to cause the computerized device to perform a method for transferring an established communication session in a telecommunications network, the communication session may be established between one of a plurality of communication clients associated with a user and a remote device associated with a remote party, the method may comprise, at a device associated with the user:

configuring a user interface on the device to display at least one communication session transfer option to the user;

receiving, via the user interface, user input indicating selection of the displayed at least one communication session transfer option by the user; and transmitting, to a call control system located in the signaling path for the established communication session, a communication session transfer request, the transmitted communication session transfer request may be operable to instruct the call control system to initiate transfer of the established communication session from the one of the communication clients in the plurality to another communication client in the plurality, the transfer may be conducted on the basis of a preconfigured data set, specific to the user, identifying one or more of the plurality of communication clients associated with the user.

In accordance with seventh embodiments, there is a method of transferring an established communication session in a telecommunications network, the communication session may be established between one of a plurality of communication clients associated with a user and a remote device associated with a remote party, the method may comprise, at a device associated with the user:

maintaining a set of one or more communication session triggering conditions;

in response to detecting that at least of the one or more communication session triggering conditions has occurred, transmitting, to a call control system located in the signaling path for the established communication session, a communication session transfer request, the transmitted communication session transfer request may be operable to instruct the call control system to initiate transfer of the established communication session from the one of the communication clients in the plurality to another communication client in the plurality, the transfer may be conducted on the basis of a preconfigured data set, specific to the user, identifying one or more of the plurality of communication clients associated with the user.

Further features and advantages will become apparent from the following description of preferred embodiments, given by way of example only, which is made with reference to the accompanying drawings.

DETAILED DESCRIPTION OF CERTAIN INVENTIVE EMBODIMENTS

Figure 1:
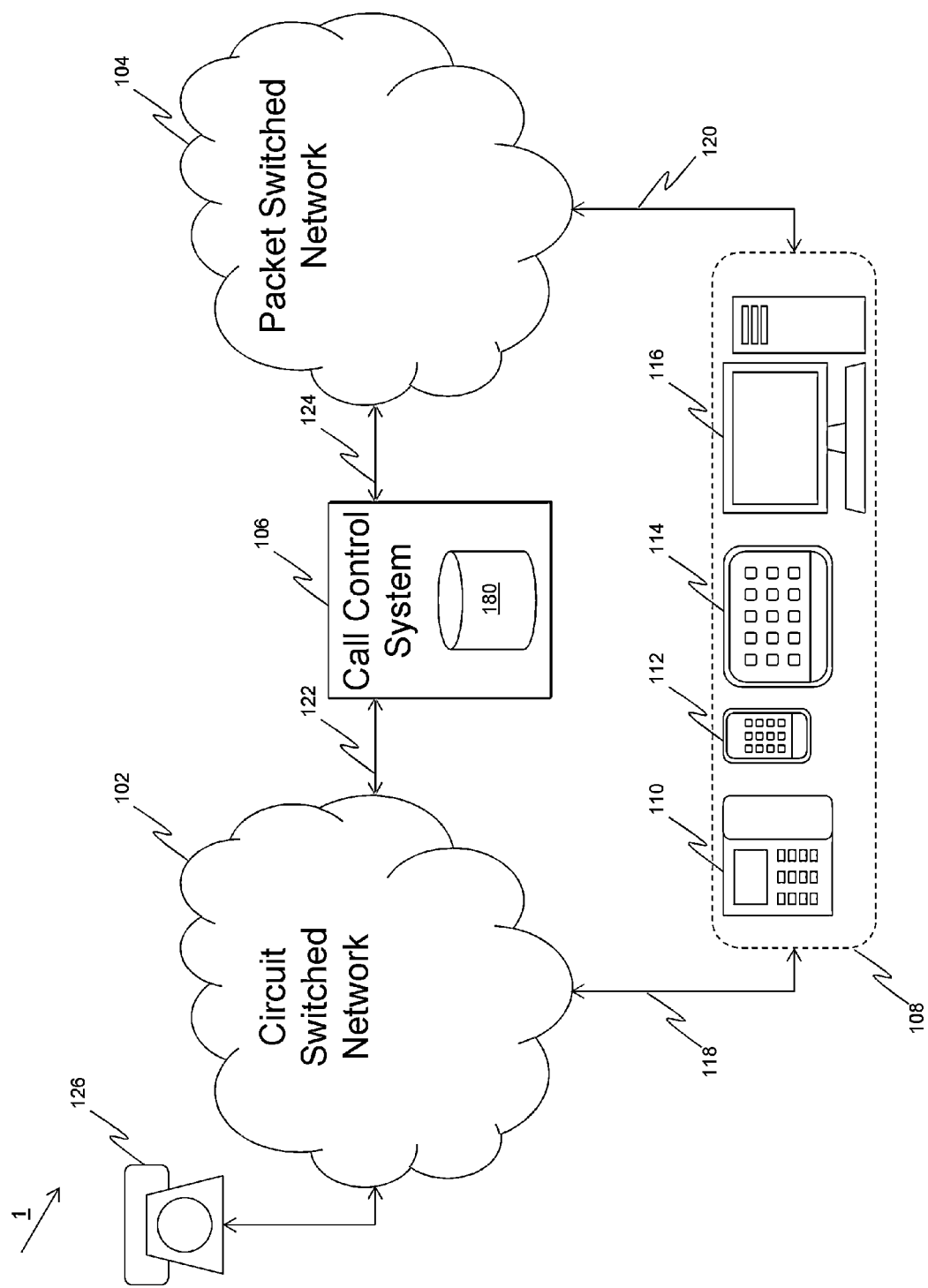
FIG. 1 shows a system diagram according to embodiments.

FIG. 1 shows an exemplary telecommunications network 1 in which embodiments of the present disclosure can be implemented. Telecommunications network 1 includes a circuit-switched telecommunications network part 102, a packet-switched network part 104 and may include other network parts (not shown). According to embodiments, a client-shared telephony service is hosted and controlled by a call control system 106.

Although depicted in FIG. 1 as a single network entity located in-between circuit-switched network 102 and packet-switched network 104, call control system 106 may comprise a plurality of network entities, with elements located within circuit-switched network 102 and/or packet-switched network 104 or one or more other networks (not shown). Call control system 106 may comprise a database 180 for storing data associated with client-shared telephony services.

A user of the client-shared telephony service may have a number of user devices 108 through which they may conduct communication sessions via the service. The various devices 108 through which a user can conduct communications via the service are considered to be associated with that user. The user's associated devices may include, for example, desk phone 110, mobile (or 'cellular') telephone 112, tablet 114 and/or personal computer 116.

Each of the user's telephony devices is equipped with one or more interfaces and one or more communication clients for conducting communications in telecommunications network 1. Devices equipped with a circuit-switched interface and communication client are adapted to conduct communications in telecommunications network 1 via link 118 with circuit-switched network 102. The circuit-switched interface may comprise a landline PSTN interface in the case of a fixed-line device such as desk phone 110, or a cellular radio telephony interface in the case of a mobile device such as mobile telephone 112. Devices equipped with a packet-switched communications client are adapted to conduct communications in telecommunications network via link 120 with packet-switched network 104. This packet-switched interface could comprise a wired interface to the internet in the case of a fixed line device such as personal computer 116, or a wireless interface (e.g. Wi-Fi, Bluetooth, 3G-LTE, WiMax, etc.) to the internet in the case of a mobile device such as tablet 114. The packet-switched interface may comprise an Ethernet part.

Some devices may be equipped with multiple communications clients. For example, in addition to the aforementioned circuit-switched communication client and associated interface, mobile telephone 112 may also be equipped with one or more packet-switched communications clients and interfaces for conducting communications with packet-switched network 104 via link 120. In this case, the multiple communication clients equipped on mobile telephone 112 are referred to as co-located communication clients, i.e. multiple communication clients on a single device.

A communication session established between a communication client on one of the user's devices 108 and a communication client on a device of a remote party 126 can be routed between circuit-switched network 102 and call control system 106 via link 122. Link 122 may for example comprise a SIP trunk, or other high capacity communications link. Similarly, communication sessions can be routed between packet-switched network 104 and call control system 106 via link 124. Link 122 and/or link 124 may comprise one or more gateway or session border controller entities (not shown) which carry out conversion between the various protocols and data formats used to transfer media data and signaling data in the different networks making up telecommunications network 1. For example, a media gateway (not shown) may convert between the different protocols of media data passing between circuit-switched network 102 and packet-switched network 104, such as packetized VoIP data into Time-Division-Multiplexing (TDM) voice data and vice versa. A signaling gateway (not shown) may convert between the different protocols of signaling information passing between circuit-switched network 102 and packet-switched network 104, such as SIP, Signaling System 7 (SS7), Integrated Services Digital Network User Part (ISUP), American National Standards Institute (ANSI)—41, Mobile Application Part (MAP) formats, etc.

In order to provide the client-shared telephony service, circuit-switched network 102 is configured to route communication sessions conducted between the user's devices 108 and a remote party device 126 via call control system 106. Call control system 106 may comprise a media gateway controller, service platform, call agent, application server or softswitch and may also perform other functions typically associated with such entities.

In embodiments, call control system 106 is located in the signaling path for communication sessions conducted to/from a user's devices 108. In embodiments, call control system 106 is located in the media path for communication sessions conducted to/from a user's devices 108.

Operation of the client-shared telephony service in telecommunications network 1 will now be described in relation to FIG. 2.

Figure 2:
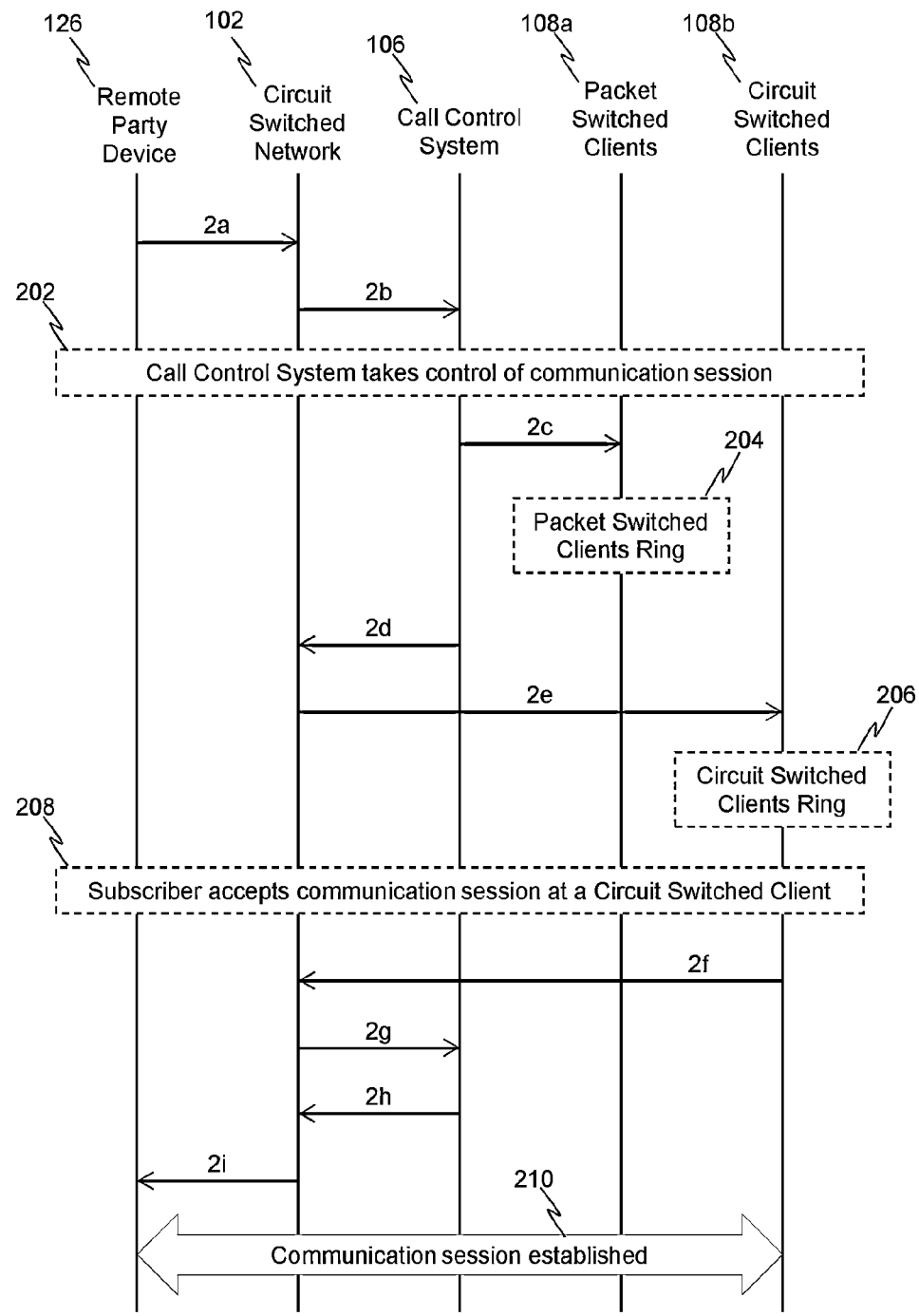
FIG. 2 shows a flow diagram according to embodiments.

FIG. 2 shows a signaling message flow diagram describing the operation of telecommunications network 1 of FIG. 1 for providing a client-shared telephony service according to embodiments.

At step 2*a*, a communication session setup request to the client-shared dialing number is transmitted by a communication client on remote party device 126. Circuit-switched network 102 has been configured to route communication session signaling data relating to the client-shared dialing number service to call control system 106, and contacts call control system with appropriate communication session signaling data accordingly in step 2*b*. Upon receipt of the communication session signaling data of step 2*b*, call control system 106 takes control of the communication session, as shown by item 202.

At step 2*c*, call control system 106 transmits communication session set up requests to the user's packet-switched communication clients 108*a* via packet-switched network 104. Upon receipt of such communication session set up requests, the user's packet-switched communication clients 108*a* will (unless unavailable, for example due to network problems or due to being switched off) alert the user as to the request for incoming communication as shown by item 204. Such alerting will involve activating one or more alert functions on the appropriate device, such as ring and/or vibrate functions. Similarly, at step 2*d*, call control system 106 transmits communication session set up requests to the user's circuit-switched clients 108*b* via circuit-switched network 102 in step 2*e*. Upon receipt of such communication session set up requests, the user's circuit-switched communication clients 108*b* will alert the user accordingly, as shown by item 206.

The result of steps 2*a* to 2*e* is that all of the user's communication clients (which are available) will ring, allowing the user to select at which communication client (and therefore via which associated access technology) on which device to accept the received communication session set up request and hence conduct a communication session on.

In the embodiments depicted in FIG. 2, the user accepts the communication session set up request at one of their circuit-switched communication clients, at step 208, by entering appropriate user input e.g. by pressing an answer key via a user interface on the device on which the circuit-switched communication client in question is deployed. This results in the transmission of a communication session setup response message (in this case an acceptance response message) being transmitted from the circuit-switched communication client back to call control system 106 via circuit-switched network 102, as shown by steps 2f and 2g. Call control system 106 then transmits a communication session setup response (acceptance) message back to remote party device 126 via circuit-switched network entity 102, as shown by steps 2h and 2i. Having completed the end-to-end communication session set up signaling flow, a communication session is established between remote party device 126 and the circuit-switched communication client 108b at which the communication session was accepted by the user as shown by item 210.

Note that in the embodiments depicted in FIG. 2, the user chose to accept the communication session setup request such that an acceptance response message was generated by the user communication client in question. If the user had chosen to reject the communication session setup request, then the user communication client in question would have generated a rejection response message, transmitted the rejection response message to call control system 106 and a communication session would not have been established with remote party device 126.

In embodiments, established communication session 210 consists of multiple communication session legs. A communication session leg is a subset of the established communication session that provides end to end communication for a part of a communication session path. For example, communication session 210 may comprise one communication session leg between remote party device 126 and call control system 106, and another communication session leg between call control system 106 and a user communication client 108. This allows call control system 106 to maintain its presence on the communication session path and provide additional features or call services if required. Each of the communication session legs between call control system 106 and the remote party device communication client may actually be subdivided into a number of further legs, but will be referred to below as a single leg for the sake of simplicity. Further, the communication session legs need not connect to the same node in call control system 106 and may be bridged by one or more further legs in order to provide the required end-to-end communications.

Figure 3:
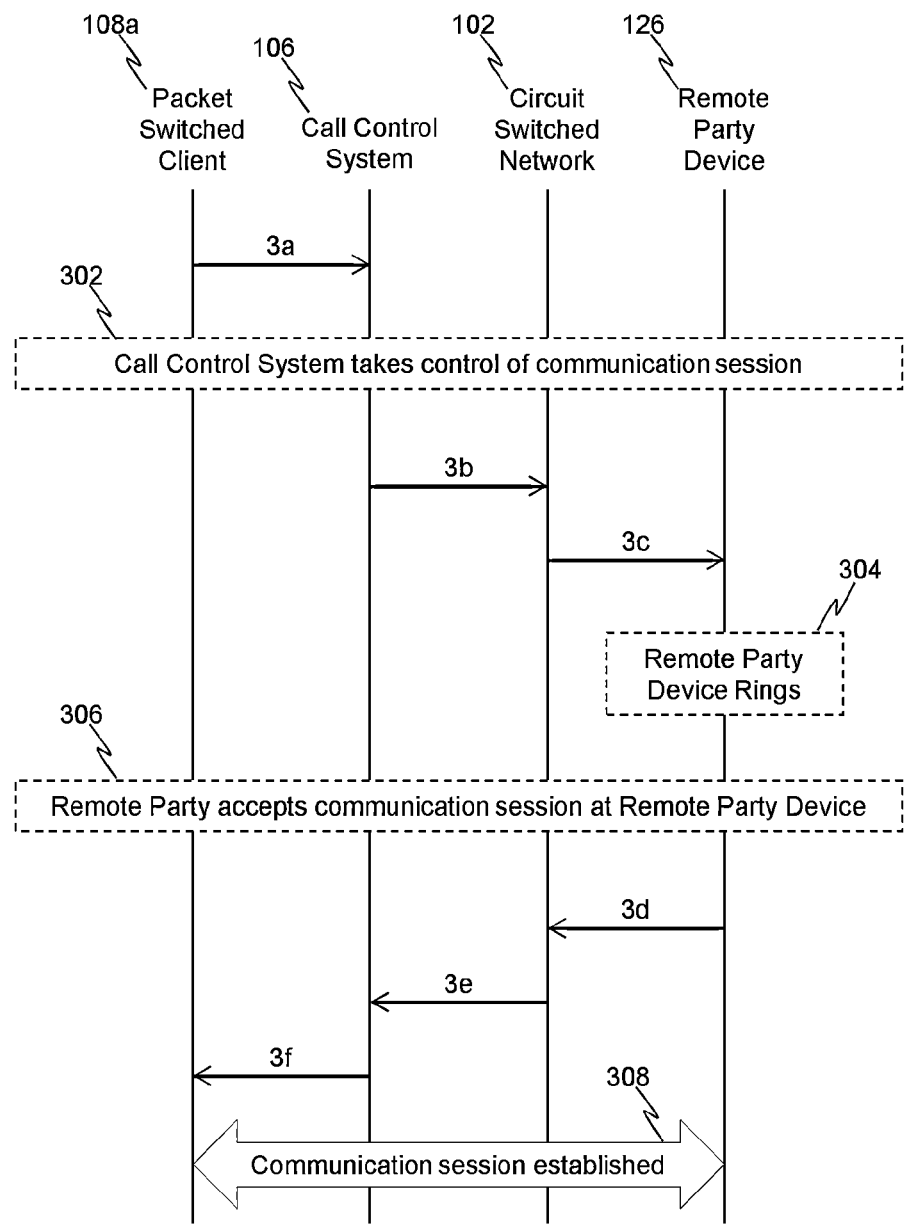
FIG. 3 shows a flow diagram according to embodiments.

FIG. 3 shows a signaling message flow diagram describing the operation of telecommunications network 1 of FIG. 1 when a user initiates (or 'places') a call from a packet-switched client of the client-shared telephony service according to embodiments.

At step 3a, when a user enters in a telephone dialing number or other identifier for remote party device 126 or selects a corresponding entry from a contact address book or suchlike, packet-switched client 108a, located on a device associated with a user of the client-shared telephony service, generates and transmits a communication session setup request, directed to a communication client on remote party device 126, from packet-switched client 108a to call control system 106 via packet-switched network 104. Upon receipt of the communication session setup request of step 3a, call control system 106 takes control of the communication session, as shown by item 302.

Having taken control of the communication session, call control system 106 transmits a communication session setup request to remote party device 126 via circuit-switched network 102, as shown by steps 3b and 3c. The communication setup request of step 3c may pass through a number of further entities or network parts (not shown) between call control system 106, circuit-switched network 102 and remote party device 126 such as one or more telephone switches (or 'local exchanges', 'central offices' or 'class 5 switches').

Upon receipt of the communication session setup request of step 3c, the communication client on remote party device 126 will alert the remote party as to the incoming request for setup of a communication session; such alerting may involve activation of an alert function on remote party device such as a ringing function (as shown by item 304) and/or a vibrate function, etc. In the embodiments of FIG. 3, the remote party accepts the communication session setup request at step 306 by appropriate user input on remote party device 126. This results in the transmission of a communication session setup response message (in this case an acceptance response message) being transmitted from the communication client on remote party device 126 back to circuit-switched network 102 in step 3d. Circuit-switched network 102 has been configured to route communication session signaling data relating to the client-shared dialing number to call control system 106 and contacts call control system 106 with appropriate communication session signaling data accordingly in step 3e.

Upon receipt of the communication session signaling data of step 3e, call control system 106 transmits a communication session setup response (acceptance) message back to packet-switched client 108a via packet-switched network 104, as shown by step 3f. Having completed the end-to-end communication session setup signaling flow, a communication session is established between packet-switched communication client 108a and remote party device 126, as shown by item 308.

Note that in the embodiments depicted in FIG. 3, the remote party chose to accept the communication session setup request such that an acceptance response message was generated by the communication client on remote party device 126. If the remote party had chosen to reject the communication session setup request, then the communication client on the remote party device would have generated and transmitted a rejection response message and a communication session would not have been established.

Figure 4:
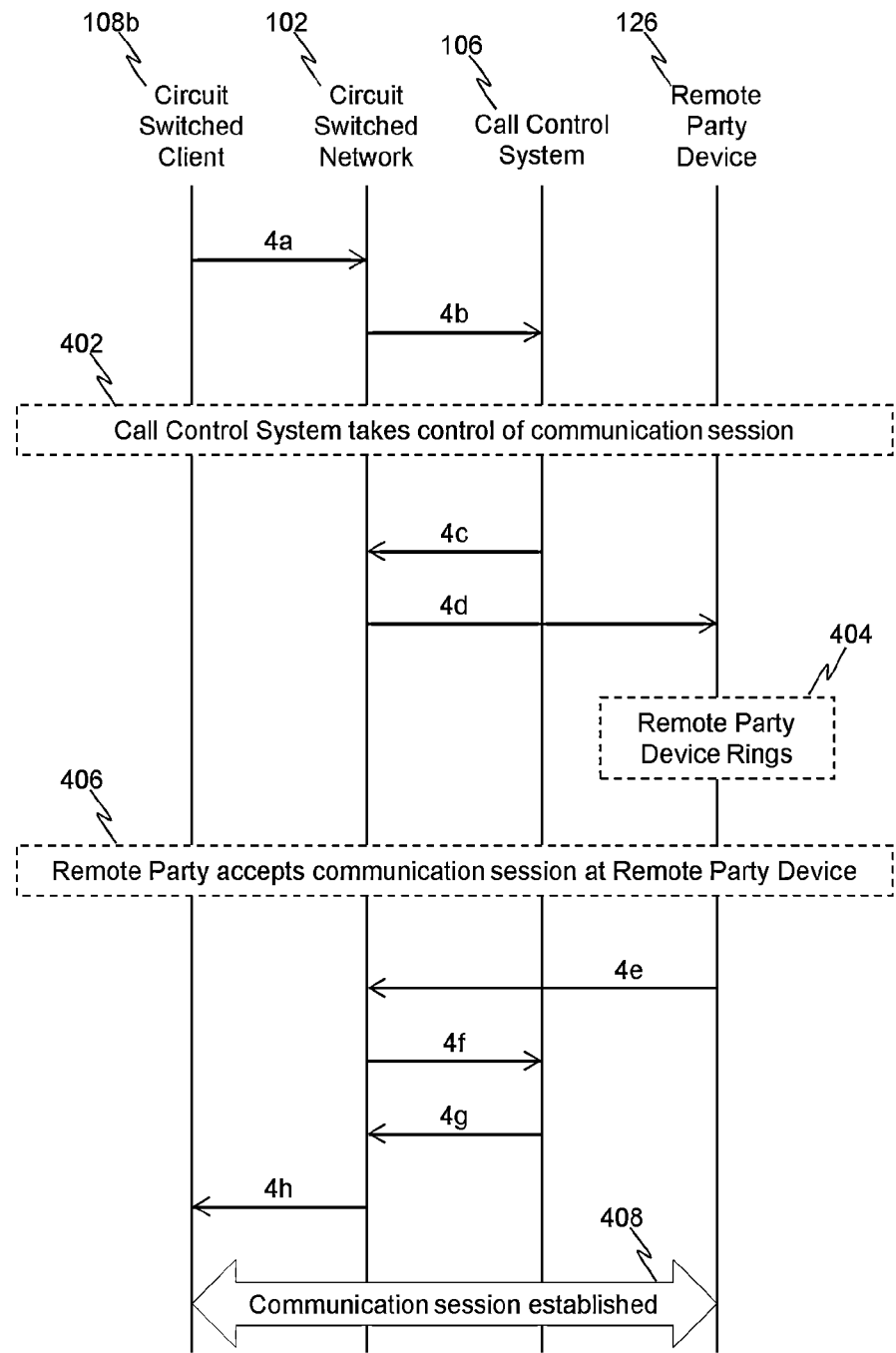
FIG. 4 shows a flow diagram according to embodiments.

FIG. 4 shows a signaling message flow diagram describing the operation of telecommunications network 1 of FIG. 1 for a user initiating a call from a circuit-switched client of the client-shared telephony service according to embodiments.

At step 4a, when a user enters in a telephone dialing number or other identifier for remote party device 126 or selects a corresponding entry from a contact address book or suchlike, circuit-switched client 108b, located on a device associated with a user of the client-shared telephony service, generates and transmits a communication session setup request directed to a communication client on remote party device 126, into circuit-switched network 102. Circuit-switched network 102 has been configured to route communication session signaling data relating to the client-shared dialing number service to call control system 106, and contacts call control system 106 with appropriate communication session signaling data accordingly in step 4b. Upon receipt of the communication session signaling data of step 4b, call control system 106 takes control of the communication session, as shown by item 402.

Having taken control of the communication session, call control system 106 transmits a communication session setup request to remote party device 126 via circuit-switched network 102, as shown by steps 4c and 4d. The communication setup request of step 4d may pass through a number of further entities or network parts (not shown) between call control system 106, circuit-switched network 102 and remote party device 126 such as one or more telephone switches (or 'local exchanges', 'central offices' or 'class 5 switches').

Upon receipt of the communication session setup request of step 4d, the communication client on remote party device 126 will alert the remote party as to the incoming request for setup of a communication session; such alerting may involve activation of an alert function on remote party device such as a ringing function (as shown by item 404) and/or a vibrate function, etc. In the embodiments of FIG. 4, the remote party accepts the communication session setup request at step 406 by appropriate user input on remote party device 126. This results in the transmission of a communication session setup response message (in this case an acceptance response message) being transmitted from the communication client on remote party device 126 back to circuit-switched network 102 in step 4e. Circuit-switched network 102 has been configured to route communication session signaling data relating to the client-shared dialing number service to call control system 106 and contacts call control system 106 with appropriate communication session signaling data accordingly in step 4f.

Upon receipt of the communication session signaling data of step 4f, call control system 106 transmits a communication session setup response (acceptance) message back to circuit-switched client 108b via circuit-switched network 102, as shown by steps 4g and 4h. Having completed the end-to-end communication session setup signaling flow, a communication session is established between remote party device 126 and the circuit-switched communication client 108b.

Figure 5:
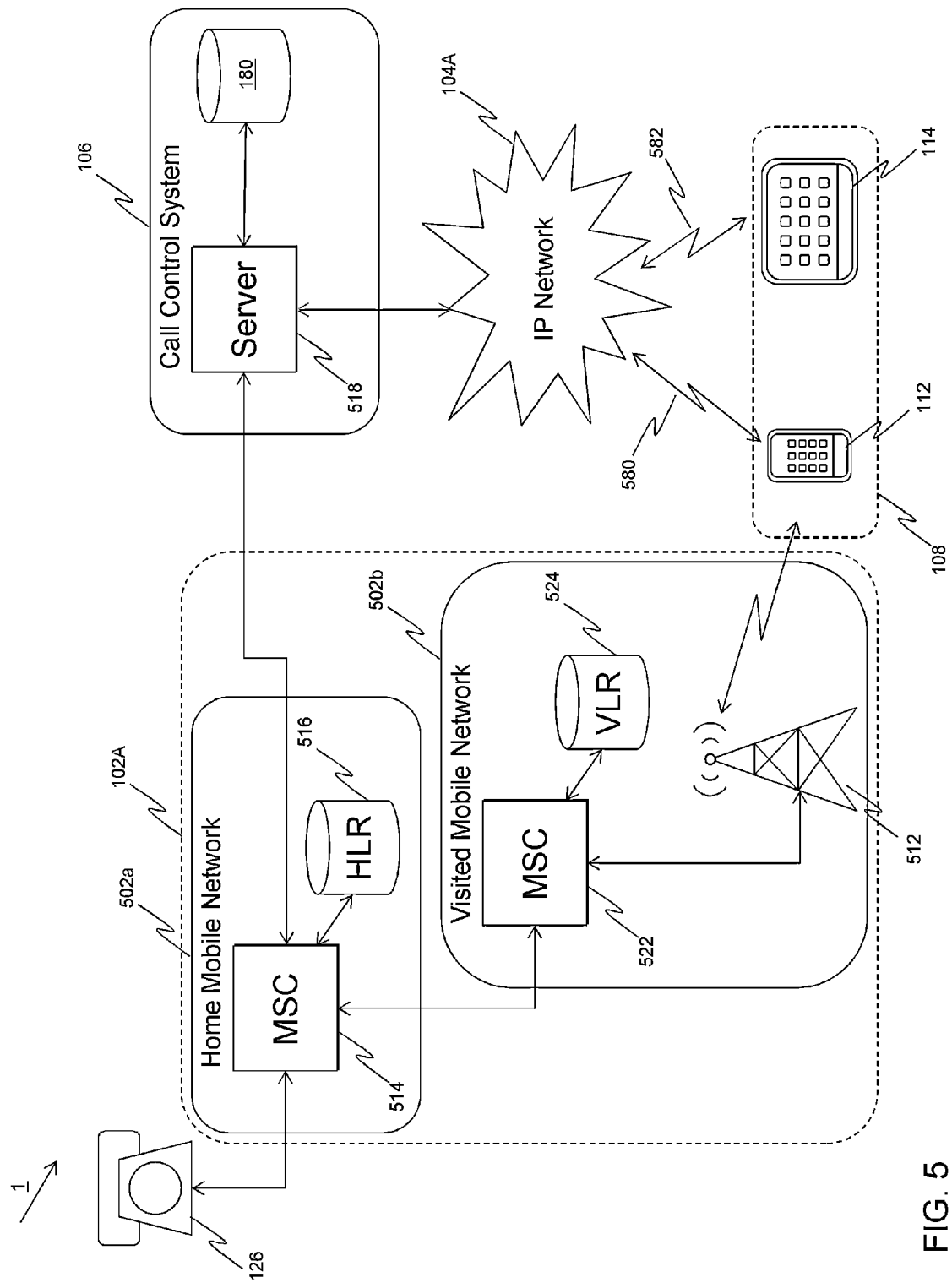
FIG. 5 shows a system diagram according to embodiments.

FIG. 5 shows telecommunications network 1 depicted in FIG. 1 in more detail according to embodiments; in such embodiments, circuit switched-network part 102 may comprise a mobile (or 'cellular') telephony network 102A and packet-switched network part 104 may comprise IP network 104A. A client-shared telephony service is hosted and controlled by call control system 106.

According to the embodiments shown in FIG. 5, a user of the client-shared telephony service has one or more devices 108 associated with their client-shared dialing number through which they may conduct communications via the service. The user's associated devices include, at least, mobile telephone 112. In embodiments, the user's associated devices also include tablet 114.

Mobile telephone 112 is equipped with a cellular radio telephony interface and circuit-switched communication client for conducting communications in telecommunications network 1 via mobile telephony network 102A. In embodiments, mobile telephone 112 is also equipped with at least one wireless packet-switched interface and packet-switched communications client for conducting communications in telecommunications network 1 via radio link 580 with IP network 104A; in such embodiments where mobile telephone comprises multiple communication clients, the communication clients are referred to as co-located communication clients.

Tablet 114 is equipped with at least one wireless packet-switched interface and packet-switched communications client for conducting communications in telecommunications network 1 via radio link 582 with IP network 104A.

The wireless packet-switched interfaces of mobile telephone 112 and/or tablet 114 could comprise a short-range radio interface such as Wi-Fi or Bluetooth, and/or an interface for communication of packet data through a cellular network such as LTE, LTE-A, HSPA, W-CDMA or Mobile WiMax, etc.

Mobile telephony network 102A allows for provision of telephony services to a number of mobile telephones, although only the user's mobile telephone 112 and tablet 114 are depicted in FIG. 5. Mobile telephony network 102A may comprise home mobile network part 502a, which is generally associated with mobile telephone 112. Communication sessions initiated to a telephone dialing number associated with mobile telephone 112, e.g. a Mobile Station International Subscriber Directory Number (MSISDN), are routed to home mobile network part 502a for processing as a result of that general association. Home mobile network part 502a may comprise mobile switching center (MSC) 514 and home location register (HLR) 516. HLR 516 may comprise a database which provides, upon request, MSC 114 with data relating to users generally associated with home mobile network 502a, such as the location of their mobile telephones and configuration data such as call routing triggers, billing information, etc.

Mobile telephony network 102A also may comprise visited mobile network part 502b, which is transiently associated with mobile telephone 112. Visited mobile network part 502b may comprise serving MSC 522, Visitor Location Register (VLR) 524 and base transceiver station (BTS) 512. BTS 512 transmits radio signals to, and receives radio signals from, the circuit-switched communications client and cellular radio telephony interface on mobile telephone 112 via a radio communication link. It is this communication relationship that provides the transient association between mobile telephone 112 and visited mobile network part 502b. Mobile telephone 112 is located in an area (commonly known as a 'cell') served by BTS 512. BTS 512 may be controlled by a basestation controller (BSC; not shown), which may also control a number of further BTSs (also not shown), which, in combination with a number of further BSCs and BTSs, may provide a number of geographically distributed cells served by MSC 522.

When mobile telephone 112 associates with serving MSC 522 (e.g. by entering a cell served by MSC 522), serving MSC 522 informs home MSC 514, which in turn updates HLR 516 with the location of mobile telephone 112. In this way, HLR 516 is kept up-to-date with the most recent location of mobile telephone 112. Additionally, configuration data relating to mobile telephone 112 is copied into VLR 524. This allows calls placed by mobile telephone 112 while being served by serving MSC 522 to be correctly handled according to the aforementioned configuration data.

Depending on the location of mobile telephone 112, home mobile network part 502a may also serve mobile telephone 112, in which case it will comprise the same network part as visited mobile network part 502b.

According to embodiments, a client-shared telephony service is provided by associating one or more communication clients (including the packet-switched communication client on mobile telephone 112) with a telephone dialing number associated with the circuit-switched communication client on mobile telephony device 112, such as its MSISDN. This can be referred to as 'twinning' the additional communication clients with the circuit-switched communication client. According to the embodiments, the client-shared dialing number is therefore the MSISDN of the circuit-switched communication client on mobile telephony device 112.

A communication session between a communication client on one of the user's devices 108 and a communication client on a device of a remote party 126 is routed between the remote party device 126 and home mobile network part 502a via one or more further network parts (not shown). In some embodiments, remote party device 126 may comprise also a mobile telephone, in which case the communication session may be routed via one or more serving mobile network parts and home mobile network parts associated with the remote party device. These could be the same as mobile network parts 502a and/or 502b, or further mobile network parts (not shown). In other embodiments, remote party device 126 may comprise a fixed line circuit-switched telephone, such as a POTS telephone, in which case the communication session may be routed via a PSTN and one or more gateway entities, such as a gateway MSC, to convert between the various protocols and data formats used to transfer media data and signaling data in the PSTN and mobile telephony network 102A. Home MSC 514 may fulfil the role of the gateway entity, or it may be fulfilled by another intermediate entity. In further alternative embodiments, remote party device 126 may comprise an IP telephony device, such as a SIP telephone, in which case the communication session may be routed via an IP network, such as the internet, and one or more gateway entities. Again, home MSC 514 may fulfil the role of the gateway entity, or it may be fulfilled by another intermediate entity.

A communication session between a communication client on one of the user's devices 108 and a communication client on remote party device 126 can be routed between mobile telephony network 102A and call control system 106 via, for example, a SIP trunk, or other high capacity communications link. The links between IP network 104A, call control system 106 and mobile telephony network 102A may comprise one or more gateway or session border controller entities (not shown) which carry out conversion between the various protocols and data formats used to transfer media data and signaling data in the different networks making up telecommunications network 1.

In order to provide a client-shared telephony service, mobile telephony network 102A is configured to route communication session setup, signaling and or/media data relating to one of the user's devices 108 via call control system 106. This can be achieved by configuring HLR 516 with one or more triggers for communication session data relating to the client-shared dialing number, such that data originating from or directed to that dialing number results in appropriate communication session signaling data being sent to call control system 106. According to some embodiments, this could comprise a routing query to establish where the communication session data should be routed.

In other embodiments, the communication session data itself may be routed to call control system 106, which then handles the sending of communication session data to any appropriate further entities. In such embodiments, communication session data transmitted from call control system 106 to the circuit-switched communication client on mobile telephone 112 would be undesirably routed back to call control system 106 by mobile telephony network 102A if routed by conventional methods on the basis of the MSISDN of the circuit-switched communication client. There are several methods for overcoming this behavior, for example, the transmitted data may include additional information to indicate that the triggers stored in HLR 516 should not be utilized, causing HLR 516 to return the location of the mobile telephone 112 instead of invoking the associated trigger. Alternatively, call control system 106 may be adapted to query HLR 516 directly via a further interface (not shown) to obtain a temporary routing number (TRN) for communicating with the circuit-switched communication client on mobile telephone 112. Routing communications to the circuit-switched communication client on mobile telephone 112 via such a TRN would not invoke the triggers stored in HLR 516, as the client-shared dialing number is not used.

Call control system 106 may comprise call control server 518, and user database 180. Call control server 518 is responsible for processing communication session data, including data such as user data stored in database 180. Database 180 is used to store data relating to a number of users of the client-shared telephony service, including a set of identifiers for the communication clients associated with each given user. In this manner, by querying database 180, call control server 518 is able to determine which communication clients and/or devices a communication session setup request received from a remote party should be routed to, or which user a communication session setup request received from a given communication client relates to, etc.

In some embodiments, database 180 is also used to store a user profile for each of the users, containing for example user-configurable preferences. These user-configurable preferences could comprise call routing preferences for defining complex ringing scenarios, which might define a subset of a user's communication clients which should be used to route calls to under certain conditions. For example, a user may wish to configure their user preferences such that only business calls are routed to their desk phone at the office if it is earlier than 6 pm on a weekday, or that calls from family are not routed to their tablet between 9 am and 5 pm on weekdays.

In embodiments, communication session setup requests are transmitted to all communication client associated with a user. However, in other embodiments, communication session setup requests are directed to a specific communication client in a number of ways. According to some embodiments, a communication session setup request is routed to a communication client on the basis of a unique identifier for that communication client. According to other embodiments, a communication session setup request is transmitted to all of a user's communication clients, but with the identifiers of the targeted communication clients included as an additional parameter.

In embodiments, when a communication client receives the communication session setup request, it checks its own identifier against the included identifiers, and alerts the user to the communication session setup request if there is a matching identifier. In embodiments, when a communication client receives the communication session setup request, it checks its own identifier against the included identifiers, and auto-answers the communication session setup request if there is a matching identifier.

A communication client that receives the communication session setup request but does not identify its own identifier as being included in the identifiers included as additional parameters will not alert the user as to the presence of communication session setup request. Such communication clients may silently reject the communication session setup request.

Call control system 106 may further comprise a media gateway controller, service platform, call agent, application server or softswitch and may perform other functions typically associated with such entities. The elements comprised by call control system 106 may be located within mobile telephony network part 102A and/or IP network part 104A, or one or more other networks (not shown).

By virtue of connecting to mobile telephony network 102A and IP network 104A via a wireless interface, each of the communication clients equipped on mobile telephone 112 may have intermittent connectivity to call control system 106, and therefore are only intermittently able to conduct communications. This may be due to mobility reasons, for example moving in and out of range of the various cells and access points, or due to interference from other wireless communication equipment etc. From the perspective of call control system 106, a communication client on tablet 114 can also be considered to have intermittent availability. Hence, database 180 may be further configured to store availability information for communication clients associated with a given user. According to some embodiments, this is achieved by configuring each communication client to periodically send a message (commonly referred to as a heartbeat) to call control server 518. If such a heartbeat message is not received by call control server 518, that communication client can be considered unavailable until a subsequent heartbeat message is successfully received. Alternatively, in other embodiments, call control server 518 is adapted to periodically "poll" each communication client to probe for its availability using a request response protocol.

Figure 6:
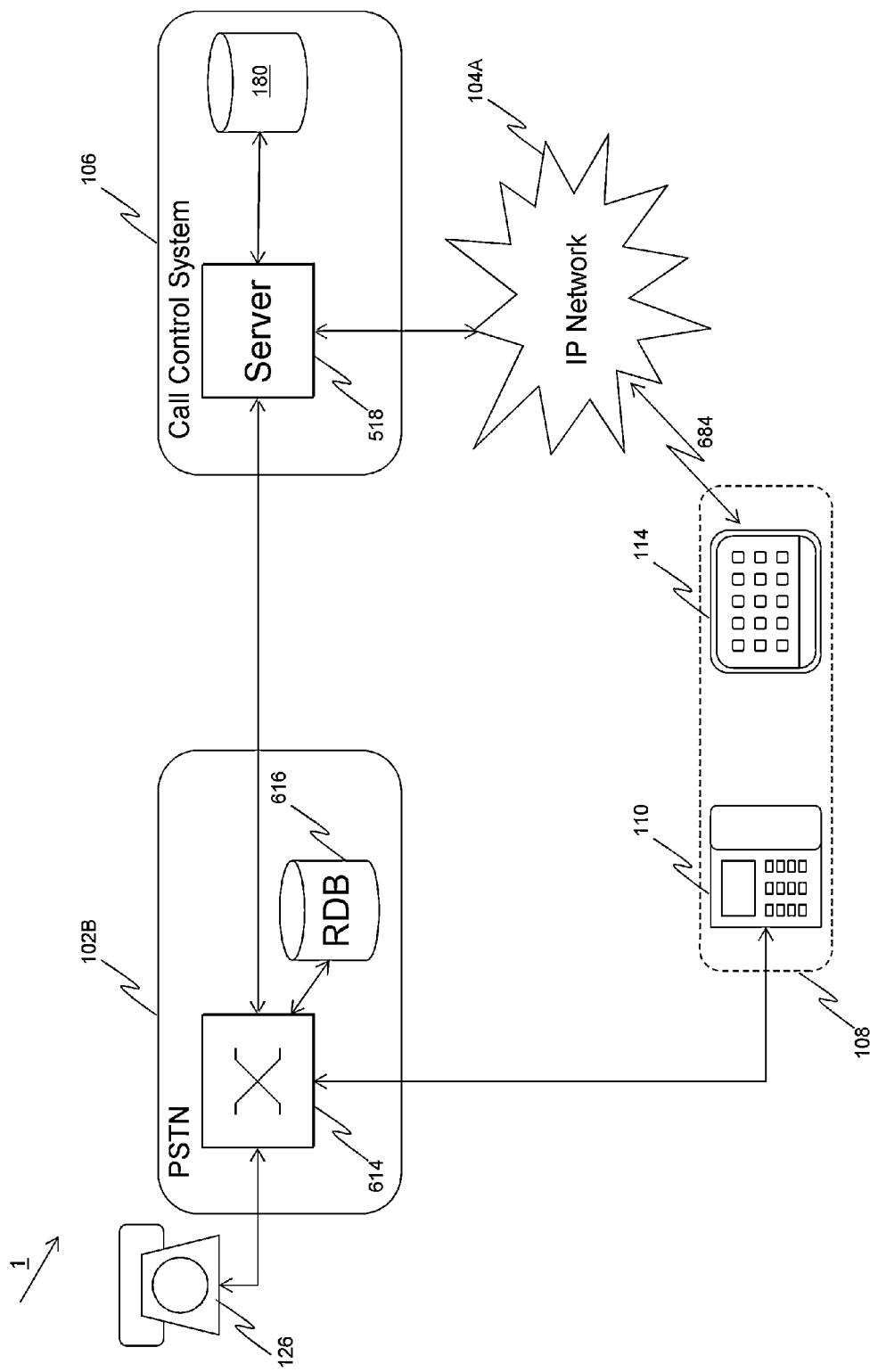
FIG. 6 shows a system diagram according to embodiments.

FIG. 6 shows telecommunications network 1 in more detail according to embodiments; in such embodiments, circuit switched-network part 102 may comprise a fixed-line circuit-switched network 102B, such as a PSTN. Telecommunications network 1 includes PSTN part 102B, IP network 104A and may include other network parts (not shown). A client-shared telephony service is hosted and controlled by call control system 106, which may comprise call control server 518 and user database 180, the functions of which are similar to those described above in relation to FIG. 5.

Circuit-switched fixed-line telephony network 102B may comprise telephone switch 614 and routing database 616. Routing database 616 is queried by telephone switch 614 in order to establish how to route communication session data. As well as providing basic routing information, routing database 616 can be configured with a number of triggers in relation to certain calling or called parties. In embodiments, routing database 616 is configured to route all communication session data either originating from, or directed to, communication clients on one of a user's devices 108 via call control system 106.

In embodiments shown in FIG. 6, the user's devices 108 comprise a desk phone 110 and tablet 114. Desk phone 110 is configured with a fixed-line circuit-switched PSTN interface and a circuit-switched communication client. Tablet 114 is equipped with a wireless packet-switched interface and a packet-switched communication client for conducting communications in telecommunications network 1 via radio link 684 with IP network 104A. The packet-switched client on tablet 114 has been configured into the multiple client shared dialing number telephony service with respect to a telephone dialing number associated with the circuit-switched client on desk phone 110. Again, this can also be described by referring to the packet switched communication client on tablet 114 as having been 'twinned' with the circuit-switched client on desk phone 110.

Figure 7:
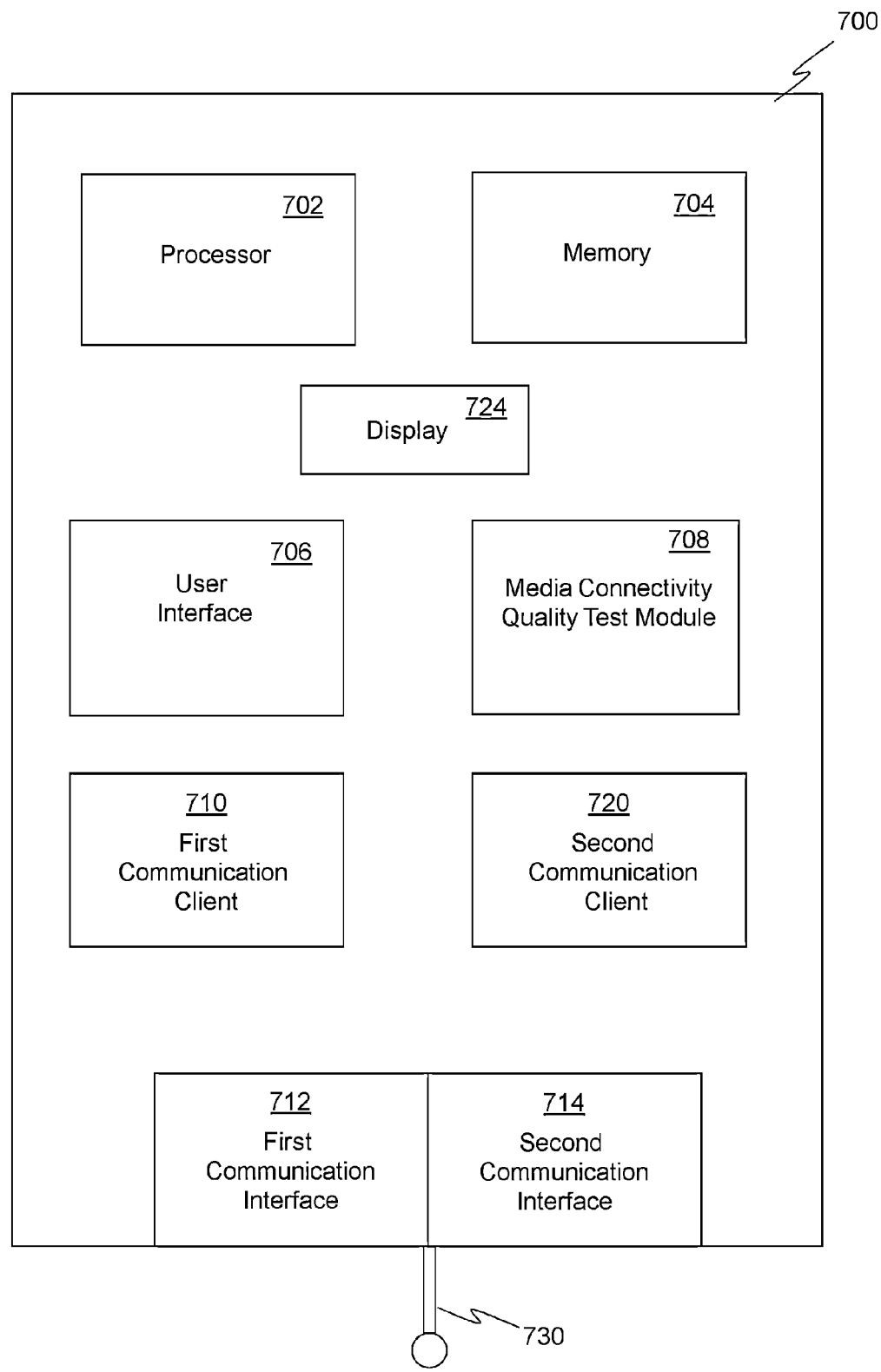
FIG. 7 shows a block diagram according to embodiments.

FIG. 7 shows a user device 700 adapted to conduct communication sessions such as voice calls in telecommunication network 1 according to embodiments. User device 700 may for example comprise mobile telephone 112 depicted in FIG. 1.

User device 700 may comprise a processor 702 for carrying out data processing tasks of embodiments. User device 700 may comprise a memory 704 for storing data, including user entries comprising identifiers for each of a user's communication clients and/or user devices. User device 700 may comprise a user interface 706 for collecting user input from a user of the device, including user input associated with setting up and acceptance of communication sessions, such as telephone dialing number digits, and call transfer operations.

In embodiments, user device 700 may comprise a display 724. In embodiments display 724 may comprise a touch-screen display, which, in conjunction with user interface 706, forms a graphical user interface. One or more touch-sensitive screen regions (or 'buttons') are configurable by processor 702 on the graphical user interface.

In embodiments, user device 700 may comprise a first communication client 710 adapted to communicate via a first part of telecommunications network 1 and a second communication client 720 adapted to communicate via a second, different part of telecommunications network 1. In such embodiments, first communication client 710 and second communication client 720 are co-located on user device 700.

First communication client 710 communicates via a first part of telecommunications network 1 via a first communication interface 712. Second communication client 710 communicates via a second part of telecommunications network 1 via a second communication interface 714. User device 700 includes one or more antennae 730 connected to first communication interface 712 and/or second communication interface 714 for wireless radio communication.

In embodiments, first communication client 710 may comprise a cellular communication client adapted to communicate via a cellular part of telecommunications network 1 and second communication client 720 may comprise a VoIP communication client adapted to communicate via a packet-switched part of telecommunications network 1. In embodiments, first communication interface 712 may comprise a cellular radio modem and second communication interface 714 may comprise a non-cellular radio modem.

Embodiments described below in relation to FIG. 8 enable transfer of an established communication session in telecommunications network 1. A communication session 800 is established between one of a plurality of communication clients associated with a user, in this example first communication client 710 on user device 700 which may comprise a packet-switched communication client and a remote device 126 associated with a remote party, for example as described above in relation to any of FIGS. 2 to 4.

Call control system 106 is located in the signaling path for the established communication session and maintains a user database 180 containing user entries for a plurality of users, each user entry may comprise a set of identifiers for communication clients associated with the respective user.

User interface 706 on user device 700 is configured to display at least one communication session transfer option to the user, in this case an option to transfer the communication session established between packet-switched communication client 710 and circuit-switched communication client 712 which is co-located on user device 700. The configuration to display the at least one communication session transfer option to the user may for example occur in response to circuit-switched communication client 712 on user device 700 detecting establishment of a communication session via co-located packet-switched communication client 710 on user device 700.

Figure 9:
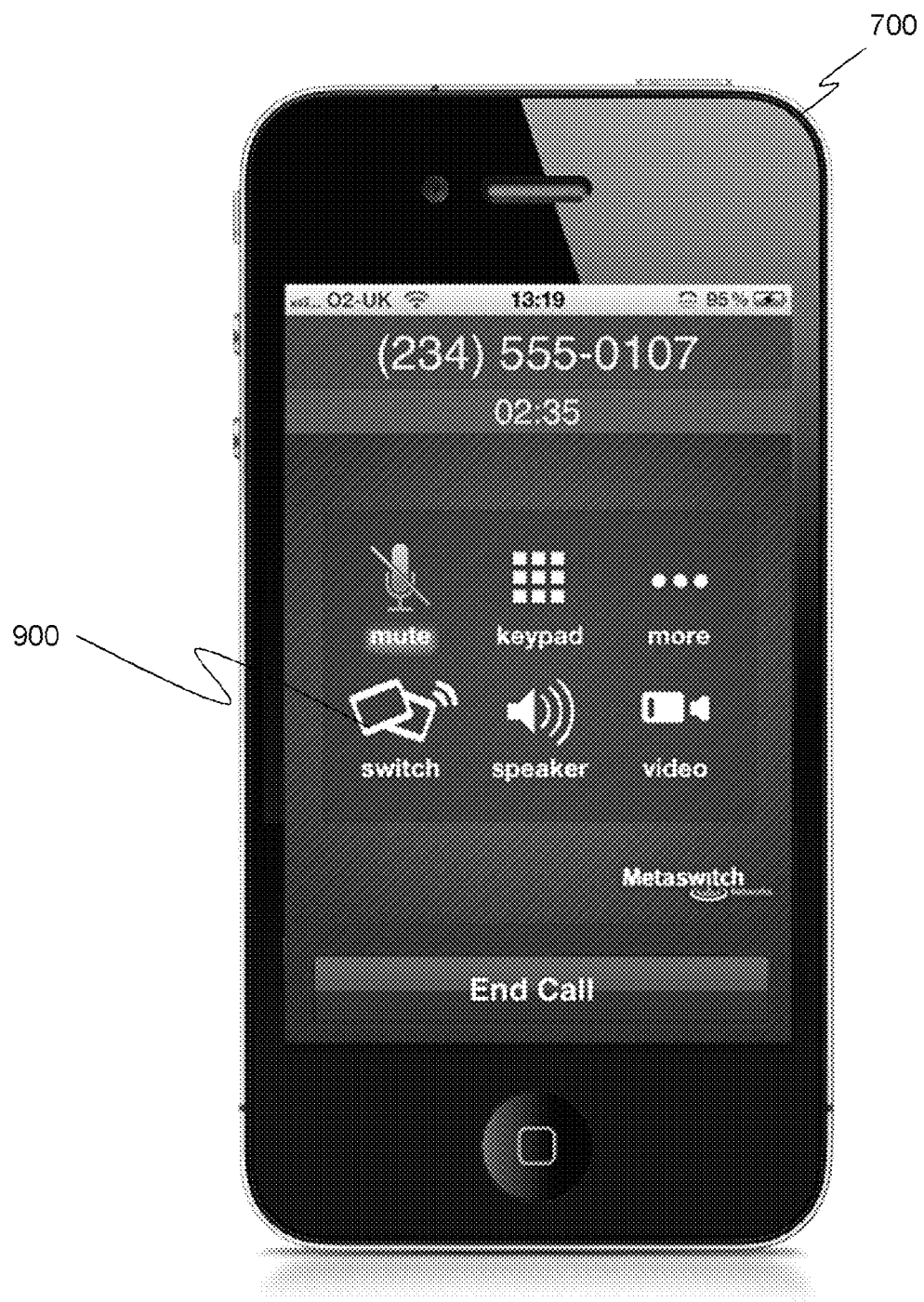
FIG. 9 shows a screen-shot of a user device according to embodiments.

An exemplary screen-shot of user device 700 configured to display at least one communication session transfer option to the user is depicted in FIG. 9 according to embodiments. Button 901 includes the text 'switch' indicating to the user that selecting this button will allow them to switch (or 'transfer' or 'jump') the established communication session to another communication client (in this case circuit-switched communication client 712).

Figure 10:
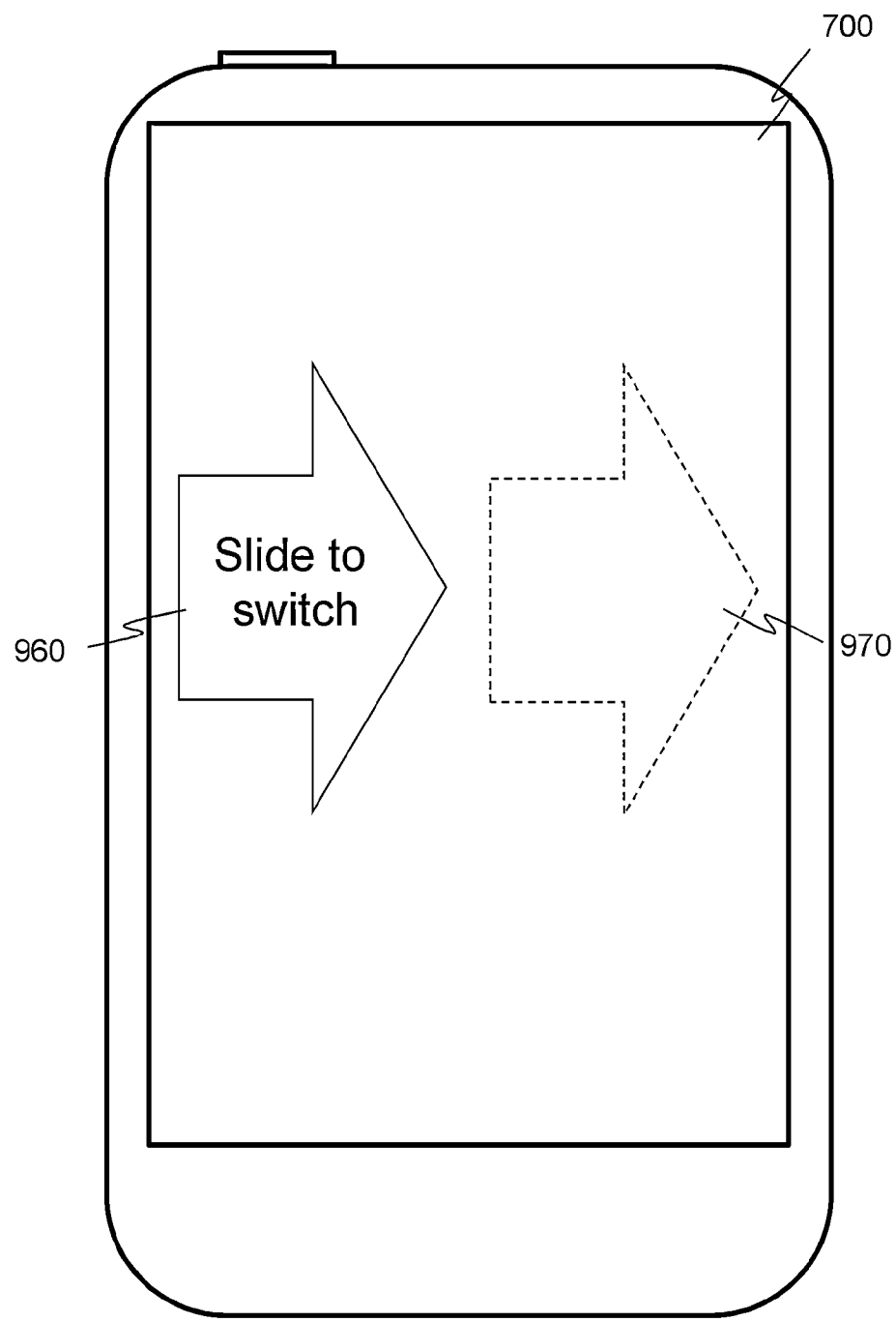
FIG. 10 shows a block diagram of a user device according to embodiments.

A diagram of user device 700 configured to display at least one communication session transfer option to the user is depicted in FIG. 10 according to embodiments. Button 960 includes the text 'slide to switch' indicating to the user that selecting this button will allow them to switch (or 'transfer' or 'jump') the established communication session to another communication client (in this case circuit-switched communication client 712). In this embodiment, the arrow form of the button which points to the right indicates to the user that they should touch the button located in position 960 and slide the button to the right to position 970 in order to initiate transfer of the communication session.

User input is received via user interface 706, as shown by step 8a, which indicates selection of the displayed at least one communication session transfer option by the user of user device 700.

Figure 8:
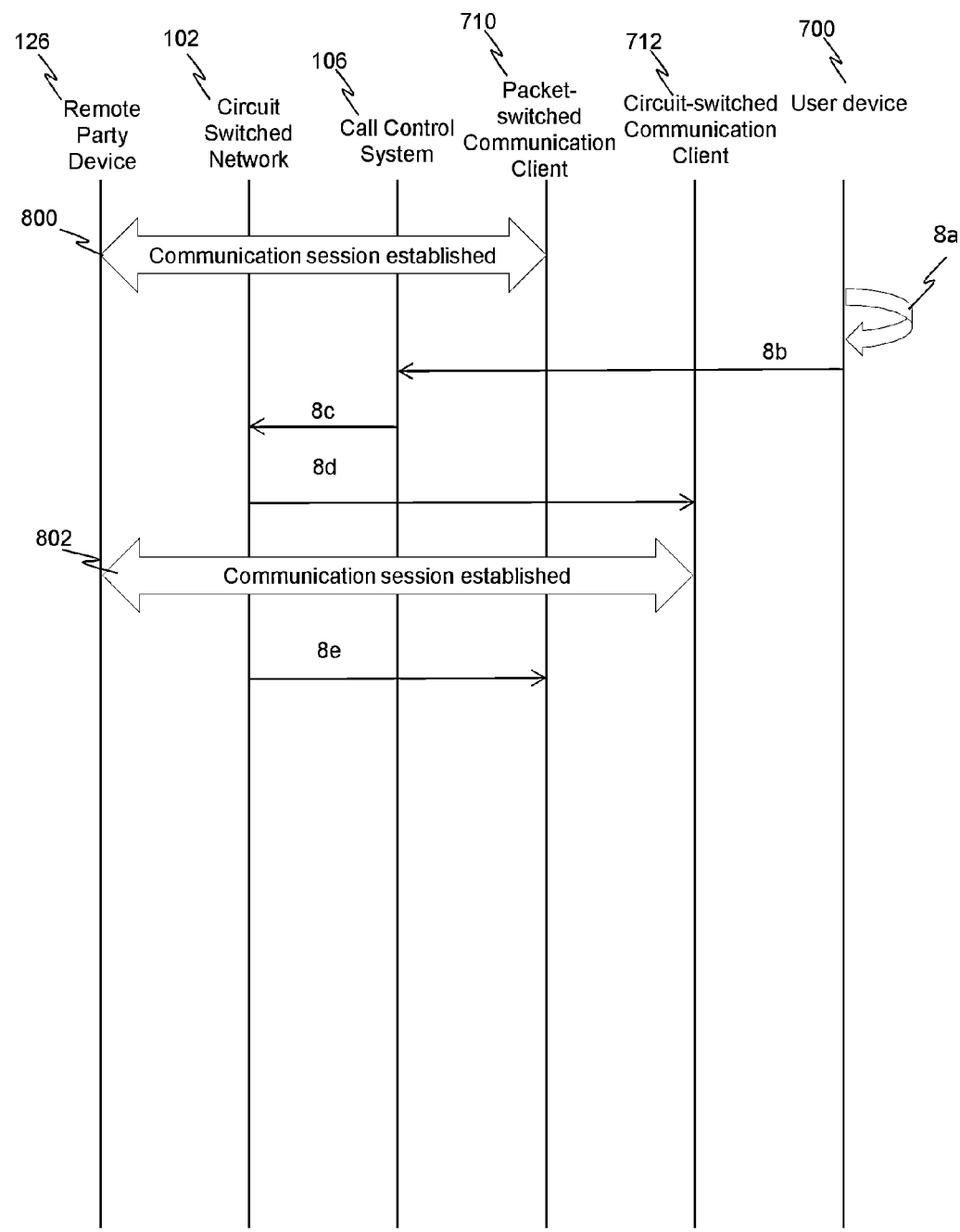
FIG. 8 shows a flow diagram according to embodiments.

User device 700 transmits, to call control system 106, a communication session transfer request, as shown by step 8b in FIG. 8. The transmitted communication session transfer request of step 8b is operable to instruct call control system 106 to initiate transfer of the established communication session from packet-switched communication client 710 to circuit-switched communication client 712.

Call control system 106 receives, from user device 700, the communication session transfer request of step 8b, the communication session transfer request of step 8b having been generated by and transmitted by user device 700 in response to the user input of step 8a via user interface 706 on user device 700. In response to receipt of the communication session transfer request of step 8b, call control system 106 performs a lookup in the user database, for example user database 180. The lookup identifies at least another communication client in the plurality of communication clients associated with the user, in this case circuit-switched communication client 712 which is co-located on user device 700. Call control system initiates transfer of the established communication session from packet-switched communication client 710 in the plurality of communication clients to circuit-switched communication client 712 in the plurality of communication clients associated with the user of user device 700.

The transfer is conducted on the basis of a preconfigured data set, specific to the user, which identifies one or more of the plurality of communication clients associated with the user. In these embodiments, the preconfigured data set is retrieved from database 180 by call control system 106.

In embodiments, the initiating may comprise transmitting a communication session leg setup request to circuit switched communication client 712 via circuit-switched network 102 in steps 8c and 8d and a communication session 802 is established between remote party device 126 and circuit-switched communication client 712.

In the embodiments depicted in FIG. 8, communication session 800 established between remote party device 126 and packet-switched communication client 710 is torn down after establishment of communication session 802 as shown by step 8e. In alternative embodiments, communication session 800 established between remote party device 126 and packet-switched communication client 710 is torn down before establishment of communication session 802.

In embodiments, user device 700 inserts an identifier for circuit-switched communication client 712 to which the user wants to transfer the communication session into the communication session transfer request of step 8b. When call control system 106 receives the identifier for the circuit-switched communication client 712, call control system 106 can thus identify which communication client the user wishes to transfer the communication session and transmits the communication session transfer request of step 8c into circuit-switched network accordingly.

In the embodiments described above in relation to FIGS. 8 to 10, the user only has two communication clients, both of which are co-located on the same user device 700. The operation of transferring a communication session from one communication client 710 on user device 700 to another communication client 712 can be described either as a 'push' operation from communication client 710 to communication client 712 or a 'pull' operation from communication client 712 to communication client 710.

In embodiments, a user has a plurality of communication clients located on a plurality of associated devices. In embodiments described below in relation to FIG. 11, a user has a user device 700 with communication client 710 and co-located communication client 712, and a further user device 900 with communication client 910. User device 700 may for example comprise mobile telephone 112 with co-located packet-switched and circuit-switched communication clients 710 and 712 and user device 900 may for example comprise tablet 114 with a packet-switched communication client 910.

Embodiments described below in relation to FIG. 11 enable transfer of an established communication session in telecommunications network 1 where the user has a choice of more than one communication client to which to transfer an established communication session to. The various networks within which each of the devices is located have been omitted here for ease of explanation.

A communication session 1100 is established between one of a plurality of communication clients associated with a user, in this example between first communication client 710 on user device 700 and a remote device 126 associated with a remote party, for example as described above in relation to any of FIGS. 2 to 4.

Call control system 106 is located in the signaling path for the established communication session and maintains a user database 180 containing user entries for a plurality of users, each user entry may comprise a set of identifiers for communication clients associated with the respective user.

Upon establishment of communication session 1100 between first communication client 710 on user device 700 and remote party device 126, call control system performs a lookup in database 180 for the user of user device 700 and determines that the user also has a user device 900 with communication client 910 installed on it. Call control system 106 therefore notifies user device 900 that there is a communication session 1200 currently being conducted between first communication client 710 on user device 700 and remote party device 126 in step 11a.

User interface 706 on user device 700 is configured to display at least one communication session transfer option to the user, in this case an option to transfer the communication session established between first communication client 710 and either second communication client 712 which is co-located on user device 700 or third communication client 910 which is located on user device 900.

User input is received via user interface 706 of user device 700, as shown by step 11b, which indicates selection of the displayed at least one communication session transfer option by the user on user device 700.

Figure 11:
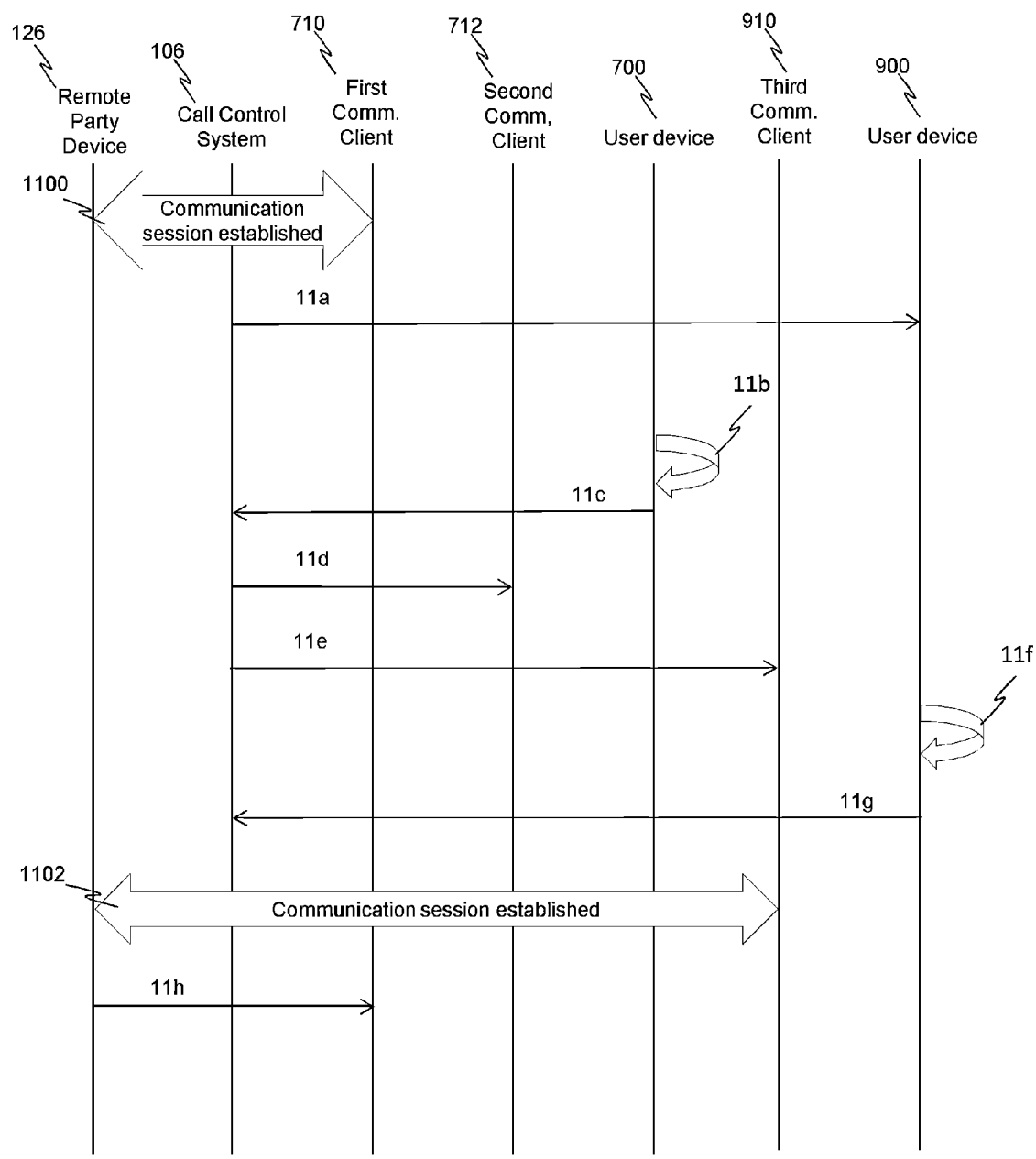
FIG. 11 shows a flow diagram according to embodiments.

User device 700 transmits, to call control system 106, a communication session transfer request, as shown by step 11c in FIG. 11. The transmitted communication session transfer request of step 11c is operable to instruct call control system 106 to initiate transfer of the established communication session from first communication client 710 on user device 700 to second communication client 712 on user device 700 or third communication client 910 on user device 900.

Call control system 106 receives, from user device 700, the communication session transfer request of step 11c, the communication session transfer request of step 11c having been generated by and transmitted by user device 700 in response to the user input of step 11b via user interface 706 on user device 700. In response to receipt of the communication session transfer request of step 11c, call control system 106 performs a lookup in the user database, for example user database 180. The lookup identifies second communication client 712 and third communication client 910 as being communication clients associated with the user.

The transfer is conducted on the basis of a preconfigured data set, specific to the user, which identifies one or more of the plurality of communication clients associated with the user. In these embodiments, the preconfigured data set is retrieved from database 180 by call control system 106.

Call control system initiates transfer of the established communication session from first communication client 710 in the plurality of communication clients to second communication client 712 on user device 700 or third communication client 910 on user device 900 by transmitting one communication session leg setup request to second communication client 712 on user device 700 in step 11d and another communication session leg setup request to third communication client 910 on user device 900 in step 11e.

Upon receipt of the communication session leg setup request of step 11d by second communication client 712, second communication client 712 alerts the user as to the receipt of the communication session leg setup request by activating an alert function on user device 700 such as a ringing function associated with second communication client 712.

Upon receipt of the communication session leg setup request of step 11e by third communication client 910, third communication client 712 alerts the user as to the receipt of the communication session leg setup request by activating an alert function on user device 900 such as a ringing function associated with third communication client 910.

The user can now choose to accept the communication session transfer at either second communication client 712 on user device 700 or third communication client 910 on user device 900. In this case, the user chooses to accept the communication session transfer third communication client 910 on user device 900 by entering suitable user input on user device 900 as shown by step 11f. The user input may for example involve the user pressing an 'answer call' button activated on a user interface of user device 900.

Upon receipt of the user input accepting the communication session transfer at third communication client 910 on user device 900, user device 900 transmits a communication session leg setup response to call control system 106 in step 11g.

Upon receipt of the communication session leg setup response of step 11g at call control system 106, call control system 106 establishes a communication session between remote party device 126 and third communication client 910 on user device 900 as shown by item 1102.

Call control system 106 tears down the communication session established between remote party device 126 and first communication client 710 in step 11h.

Note that in the embodiments described above in relation to FIG. 11 even if the user of user device 700 terminates (i.e. 'hangs-up') the communication session 1100 currently being conducted between first communication client 710 and remote party device 126 after entering user input in step 11b, call control system 106 still transmits the communication session leg setup requests of steps 11d and 11e and transfer of the terminated communication session can still take place.

In the above embodiments, once the communication session between remote party device 126 and third communication client 910 is established, call control system 106 tears down the communication session established between remote party device 126 and first communication client 710. In alternative embodiments, the communication session established between remote party device 126 and first communication client 710 is maintained. A three-way communication session (or 'teleconference') can thus ensue between the remote party, a user of user device 700 and a user of user device 900.

The alert functions activated in response to receipt of the communication session leg setup requests of steps 11d and 11e relating to transfer of a communication session between communication clients associated with a user may comprise a distinctive ring tone which sounds different from a ring tone activated in response to receipt of a communication session leg setup request associated with a standard, non-communication session transfer related request from another remote party. Such a distinctive alert function can also be useful if a user's device is a shared household telephone, such that people in the household other than the user know not to answer a transferred communication session because the telephone rings differently from normal incoming calls to the telephone.

In embodiments, initiating transfer of the established communication session may comprise transmitting an instruction to second communication client 712 and/or third communication client 910 to activate an alert function which is distinctive for a communication session transfer scenario.

In embodiments, the alert function may comprise a distinctive ringing function. A user can therefore easily distinguish between communication session transfers and standard incoming calls by listening to and recognizing the different sounding alert function associated with a communication session transfer.

In embodiments, the alert function may comprise a distinctive display function. A user can therefore easily distinguish between communication session transfers and standard incoming calls by viewing and recognizing the difference in appearance of the different display function associated with a communication session transfer.

In embodiments described above, upon establishment of communication session 1100 between first communication client 710 on user device 700 and remote party device 126, call control system performs a lookup in database 180 for the user of user device 700, determines that the user also has a user device 900 with communication client 910 installed on it and notifies user device 900 that there is a communication session 1200 currently being conducted between first communication client 710 on user device 700 and remote party device 126 in step 11*a*. In alternative embodiments, call control system 106 does not transmit the notification of step 11*a* upon establishment of communication session 1100, but waits for the occurrence of a further event such as the user opening communication session transfer application software on user device 700 or the user selecting a part of the user interface of user device 700 associated with communication session transfers, etc.

In embodiments, an additional message is transmitted from call control system 106 to first communication client 710 when the communication session leg setup requests of steps 11*d* and 11*e* are transmitted. The additional message transmitted to first communication client 710 may comprise a further communication session leg setup request, which in this case is rejected by first communication client 710 because a communication session is already established via first communication client 710.

In the embodiments described above, in response to receipt of the communication session transfer request of step 11*c*, call control system 106 performs a lookup in user database 180 in order to determine one or more communication clients associated with the user to transmit communication session setup request to, in this case first communication client 710 and third communication client 910. In alternative embodiments, some of the logic associated with the communication session transfer operation is provided by a user's device, rather than by call control system 106. In such embodiments, user device 700 maintains a set of identifiers for one or more communication clients associated with the user and inserts one or more of such identifiers into the communication session transfer request of step 11*c*. In such embodiments, call control system 106 need not maintain user database 180 with user entries for a plurality of users containing a set of identifiers for one or more communication clients associated with each user, nor perform lookup in any such database because the communication clients associated with the user (in this case first communication client 710 and third communication client 910) are identified in the communication session transfer request of step 11*c*. Call control system 106 can thus transmit the communication session let setup requests of steps 11*d* and 11*e* on the basis of information contained in the communication session transfer request of step 11*c*. In such embodiments, user device 700 may insert further logic into the communication session transfer request of step 11*c* in order to instruct call control system 106 on the communication session transfer. In such alternative embodiments, the transfer is conducted on the basis of a preconfigured data set, specific to the user, which identifies one or more of the plurality of communication clients associated with the user. In these embodiments, the preconfigured data set is provided to call control system 106 by user device 700.

The embodiments described above in relation to FIG. 11 involve the displayed at least one transfer option comprising an option to push the communication session established on first communication client 710 on user device 700 to the second communication client 712 on user device 700 or the third communication client 910 on a different user device 900.

Embodiments described below in relation to FIG. 12 involve the displayed at least one transfer option comprising an option to pull a communication session established on first communication client 710 on user device 700 to a third communication client 910 on a different user device 900.

A communication session 1200 is established between one of a plurality of communication clients associated with a user, in this example between first communication client 710 on user device 700 and a remote device 126 associated with a remote party, for example as described above in relation to any of FIGS. 2 to 4.

Call control system 106 is located in the signaling path for the established communication session and maintains a user database 180 containing user entries for a plurality of users, each user entry may comprise a set of identifiers for communication clients associated with the respective user.

Upon establishment of communication session 1200 between first communication client 710 on user device 700 and remote party device 126, call control system performs a lookup in database 180 for the user of user device 700 and determines that the user also has a user device 900 with communication client 910 installed on it. Call control system 106 therefore notifies user device 900 that there is a communication session 1200 currently being conducted between first communication client 710 on user device 700 and remote party device 126 in step 12*a*.

Upon receipt of the notification of step 12*a*, a user interface on user device 900 is configured to display at least one communication session transfer option to the user, in this case an option to pull the communication session established between first communication client 710 on user device 700 and remote party device 126 to third communication client 910 located on user device 900.

Figure 13:
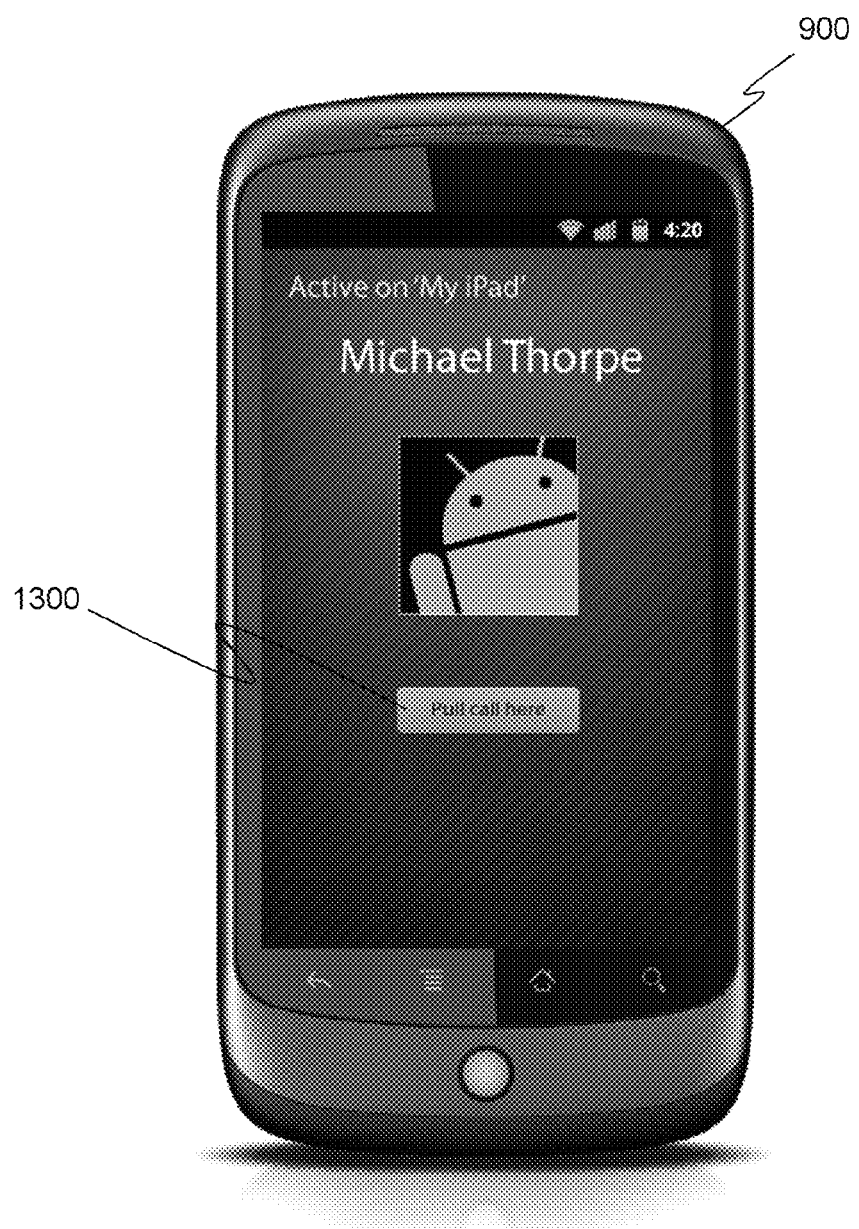
FIG. 13 shows a screen-shot of a user device according to embodiments.

An exemplary screen-shot of display of such a communication session transfer option to the user of user device 900 is given in FIG. 13. Here the user is informed that there is an active call with a third party (in this example somebody called 'Michael Thorpe') on user device 700 (which is an iPad™ in this example) and a 'pull call here' button 1300 is displayed to the user.

Figure 14:
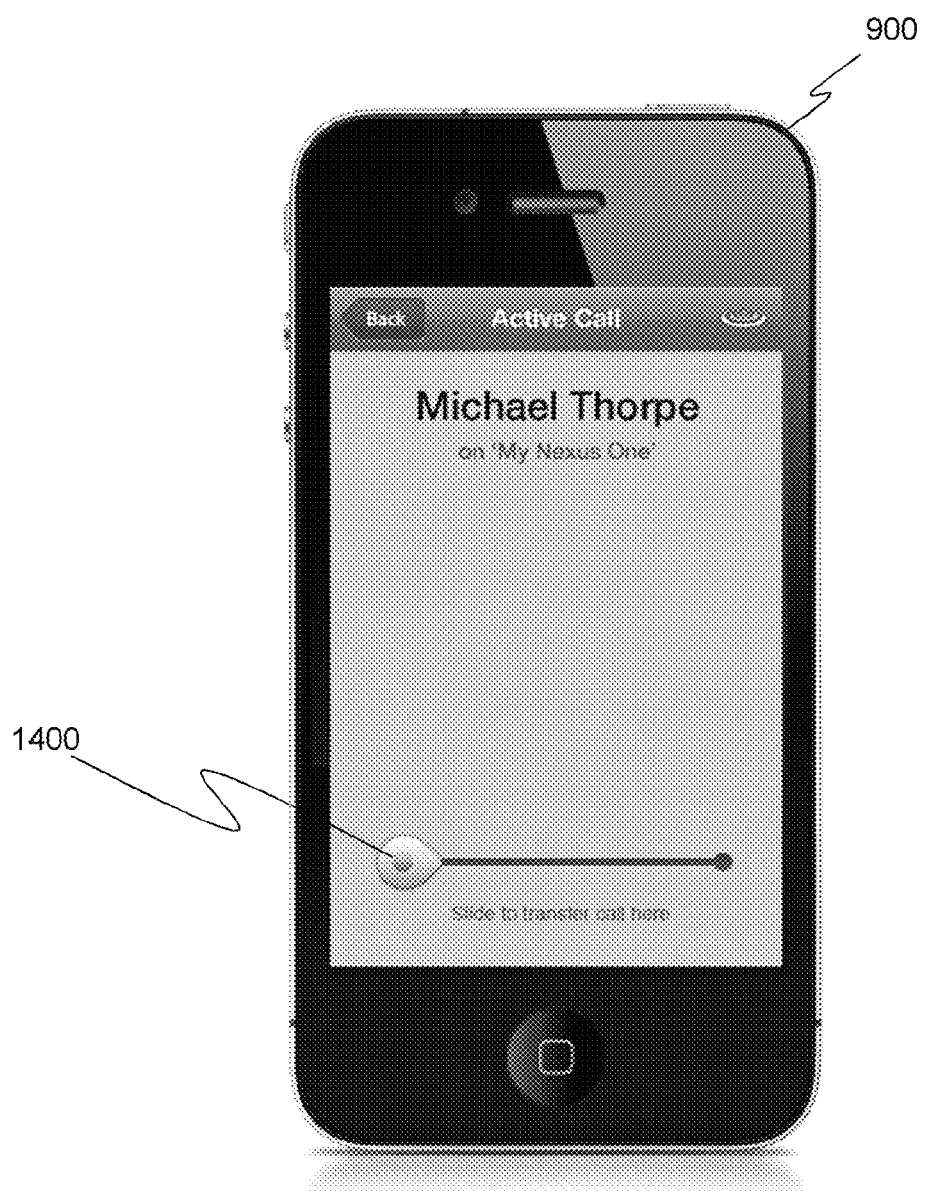
FIG. 14 shows a screen-shot of a user device according to embodiments.

A further exemplary screen-shot of display of such a communication session transfer option to the user of user device 900 is given in FIG. 14. Here the user is informed that there is an active call with Michael Thorpe on user device 700 (which is a Nexus One in this example) and a 'slide to transfer call here' button 1400 is displayed to the user.

User input is received via the user interface of user device 900, as shown by step 12*b*, (for example pushing of button 1300 or sliding of button 1400) which indicates selection of the displayed at least one communication session transfer option by the user.

Figure 12:
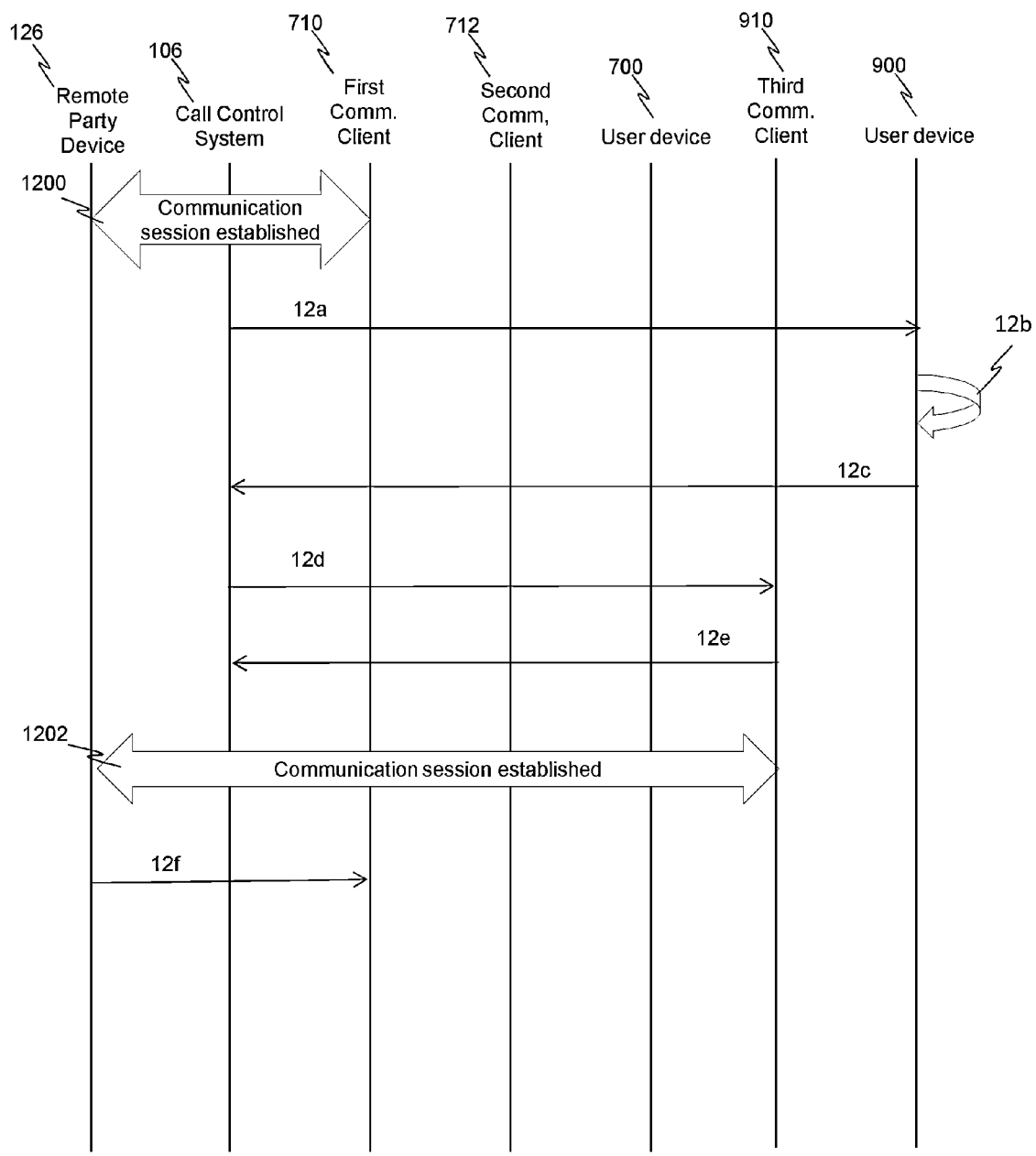
FIG. 12 shows a flow diagram according to embodiments.

User device 900 transmits, to call control system 106, a communication session transfer request, as shown by step 12*c* in FIG. 12. The transmitted communication session transfer request of step 12*c* is operable to instruct call control system 106 to initiate transfer of the established communication session from first communication client 710 on user device 700 to third communication client 910 on user device 900.

Call control system 106 receives, from user device 900, the communication session transfer request of step 12*c*, the communication session transfer request of step 12*c* having been generated and transmitted by user device 900 in response to the user input of step 12*b* via a user interface on user device 900. In response to receipt of the communication session transfer request of step 12*c*, call control system 106 performs a lookup in the user database, for example user database 180. The lookup identifies that the user of user device 900 also has a user device 700 and that a communication session is currently being conducted between first communication client 710 of user device 700 and remote party device 126.

The transfer is conducted on the basis of a preconfigured data set, specific to the user, which identifies one or more of the plurality of communication clients associated with the user. In these embodiments, the preconfigured data set is retrieved from database 180 by call control system 106.

Call control system initiates transfer of the established communication session from first communication client 710 on user device 700 to third communication client 910 on user device 900 by transmitting a communication session leg setup request to third communication client 910 on user device 900 in step 12*d*.

Upon receipt of the communication session leg setup request of step 12*d* by third communication client 910, third communication client 910 transmits a communication session leg setup response to call control system 106 in step 12*e*.

Upon receipt of the communication session leg setup response of step 12*e* at call control system 106, call control system establishes a communication session 1202 between remote party device 126 and third communication client 910 on user device 900.

Call control system 106 tears down communication session established between remote party device 126 and first communication client 710 in step 12*f*.

Note that in the embodiments described above in relation to FIG. 12 even if the user of user device 700 terminates (i.e. 'hangs-up') the communication session 1200 currently being conducted between first communication client 710 and remote party device 126 after entering user input in step 12*b*, call control system 106 still transmits the communication session leg setup request of step 12*d* and transfer of the terminated communication session can still take place.

Note that in the embodiments of FIG. 12 described above, no further user input is required on user device 900 after step 12*b* for the communication session to be transferred to third communication client 910. In embodiments, upon receipt of the user input of step 12*b*, third communication client 910 on user device 900 is configured into an auto-answer mode in relation to the initiated communication session transfer such that upon receipt of the communication session leg setup request of step 12*d* by third communication client 910, third communication client 910 transmits the communication session leg setup response of step 12*e* to call control system 106 without requiring any further user input.

Similarly to alternative embodiments described above in relation to FIG. 11, in alternative embodiments relating to FIG. 12, some of the logic associated with the communication session transfer operation is provided by a user's device, rather than by call control system 106. In such embodiments, user device 900 maintains a set of identifiers for one or more communication clients associated with the user and inserts one or more of such identifiers into the communication session transfer request of step 12*c*. In such embodiments, call control system 106 need not maintain user database 180 with user entries for a plurality of users containing a set of identifiers for one or more communication clients associated with each user, nor perform lookup in any such database because the relevant communication clients associated with the user (in this case first communication client 710 and third communication client 910) are identified in the communication session transfer request of step 12*c*. Call control system 106 can thus transmit the communication session let setup request of step 12*d* on the basis of information contained in the communication session transfer request of step 12*c*. In such embodiments, user device 700 may insert further logic into the communication session transfer request of step 12*c* in order to instruct call control system 106 on the communication session transfer. In such alternative embodiments, the transfer is conducted on the basis of a preconfigured data set, specific to the user, which identifies one or more of the plurality of communication clients associated with the user. In these embodiments, the preconfigured data set is provided to call control system 106 by user device 900.

In embodiments, a communication session transfer request transmitted to call control system 106 from a user device may comprise an identifier for the user. Upon receipt of such a communication session transfer request, call control system 106 extracts the user identifier from the received communication session transfer request and performs a lookup in user database 180. The lookup results in call control system receiving information as to the communication clients associated with that user and is thus able to contact such communication clients accordingly.

Figure 15:
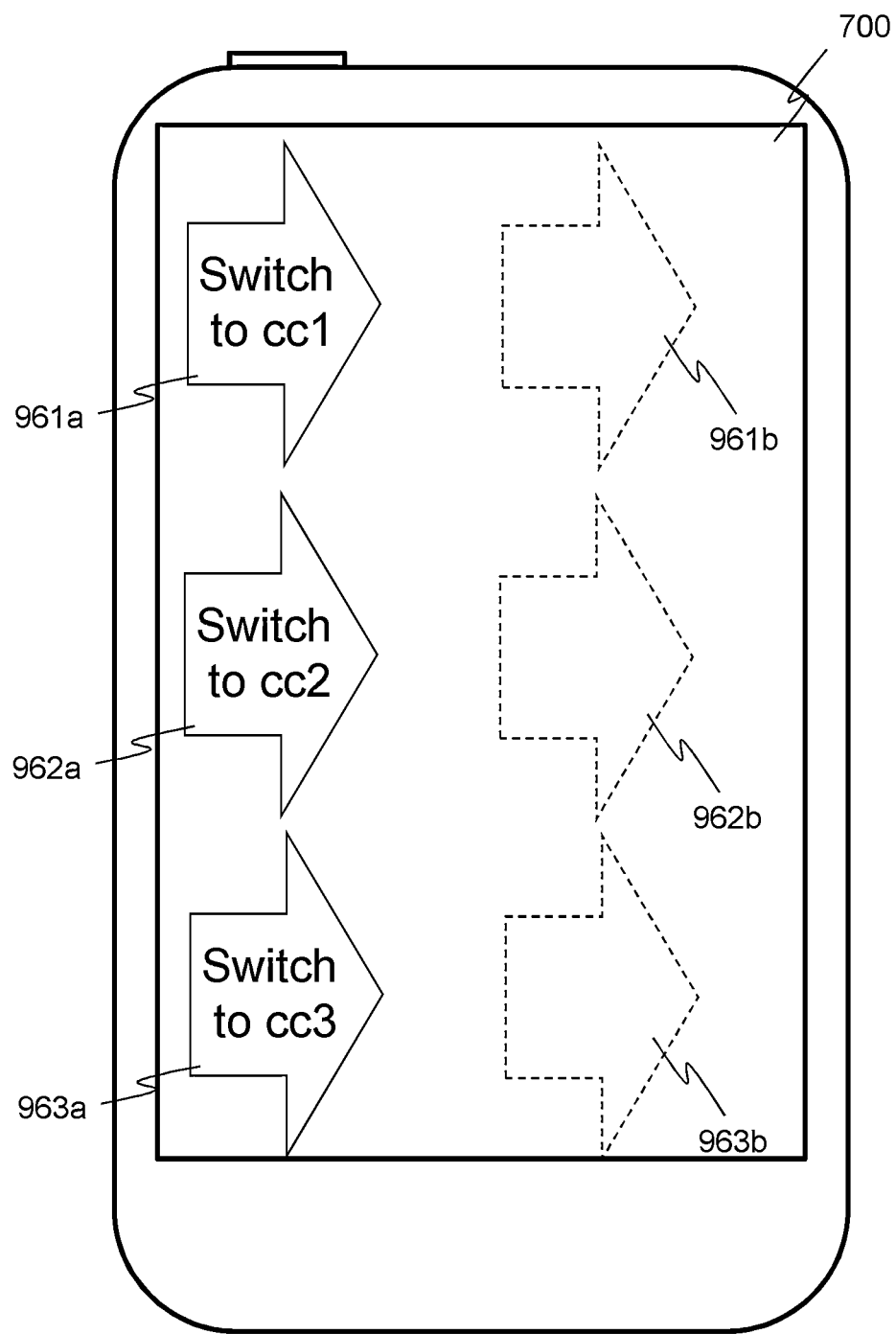
FIG. 15 shows a block diagram of a user device according to embodiments.

In embodiments, the at least one displayed communication session transfer option may comprise a set of one or more identifiers for communication clients in the plurality and the selection may comprise selection by the user of an identifier for the another communication client in the plurality from the set. A diagram of user device 700 configured to display a plurality of communication session transfer options to the user is depicted in FIG. 15 according to embodiments.

Button 961*a* includes the text 'switch to cc1' indicating to the user that selecting this button will allow them to switch to communication client number 1. The arrow form of the button which points to the right, indicates to the user that they should touch the button located in position 961*a* and slide the button to the right to position 961*b* in order to initiate transfer of the communication session to communication client number 1.

Button 962*a* includes the text 'switch to cc2' indicating to the user that selecting this button will allow them to switch to communication client number 2. The arrow form of the button which points to the right, indicates to the user that they should touch the button located in position 962*a* and slide the button to the right to position 962*b* in order to initiate transfer of the communication session to communication client number 2.

Button 963*a* includes the text 'switch to cc3' indicating to the user that selecting this button will allow them to switch to communication client number 3. The arrow form of the button which points to the right, indicates to the user that they should touch the button located in position 963*a* and slide the button to the right to position 963*b* in order to initiate transfer of the communication session to communication client number 3.

It may be inconvenient for a user to have to remember which of their communication clients is communication client number 1, which of their communication clients is communication client number 2, etc. Therefore, in embodiments, one or more of the identifiers displayed for communication clients are user-configurable, for example communication client number 1 could be user-configured to display as 'my iPhone™', communication client number 2 could be user-configured to display as 'my Skype™', communication client number 3 could be user-configured to display as 'my tablet', etc.

In embodiments, rather than a user selecting a generic initiate communication session transfer option displayed to the user, a user selects a particular communication client from a set of a plurality of communication session transfer options displayed to the user. In such embodiments, a communication session transfer request transmitted to call control system 106 from the user device may comprise an identifier for the particular communication client associated with the user which the user selected. Upon receipt of such a communication session transfer request, call control system 106 extracts the communication client identifier from the received communication session transfer request and performs a lookup in user database 180. The lookup in database 180 results in call control system 106 identifying which communication client associated with that user the user selected and is thus able to transmit a single communication session leg setup request to the particular communication client selected by the user, rather than transmitting multiple communication session leg setup requests to multiple communication clients associated with the user.

Figure 16:
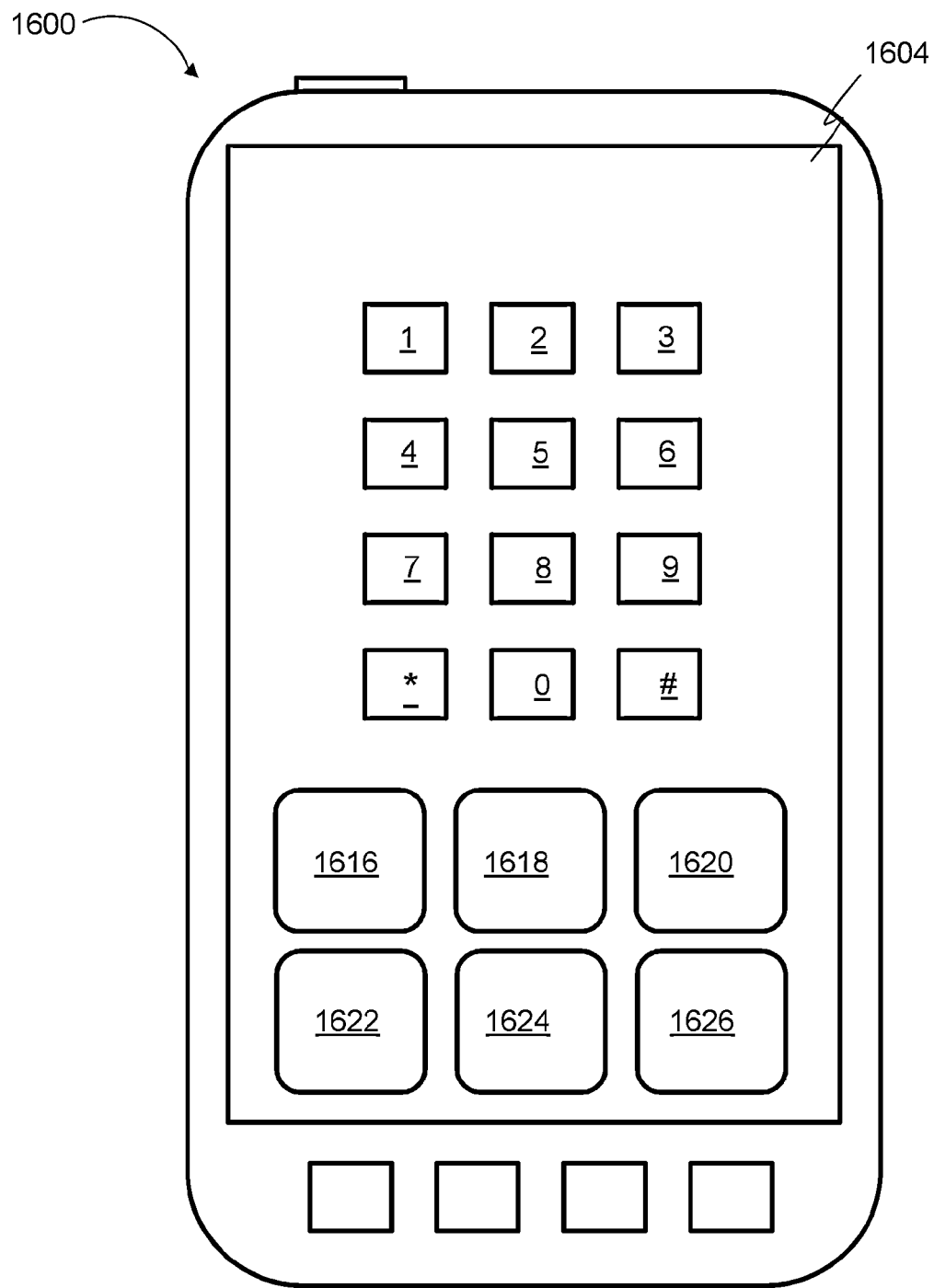
FIG. 16 shows a block diagram of a user device according to embodiments.

FIG. 16 shows a front view of a user device 1600 comprising a touch-screen user interface 1604 according to embodiments. In these embodiments, the user of user device 1600 is currently conducting a communication session with a remote party device so an in-call screen application is running on mobile telephony device 1600. The in-call screen application is displaying an in-call screen on touch-screen user interface 1604. The in-call screen displayed on touch-screen user interface 1604 includes a number of soft-keys which are responsive to user touches to provide input to the in-call screen application running on user device 1600. The soft-keys include dial-pad digits 1, 2, . . . to 0 and the * ('star') and # ('hash') symbols which are used for entering telephone dialing numbers. The soft-keys also include several other soft-keys 1616, 1618, 1620, 1622, 1624, 1626 which are operable to initiate other in-call functionality in response to user input, for example end-call, call-hold, mute, speaker-phone, and show/hide dial-pad operations.

In embodiments, one or more touch-sensitive screen regions which are operable to receive selection input from the user are configured on touch-screen user interface 1604 of user device 1600.

In embodiments, the one or more touch-sensitive screen regions are configured as an overlay portion 1732 over at least a part of a screen displayed by user device 1600.

Figure 17:
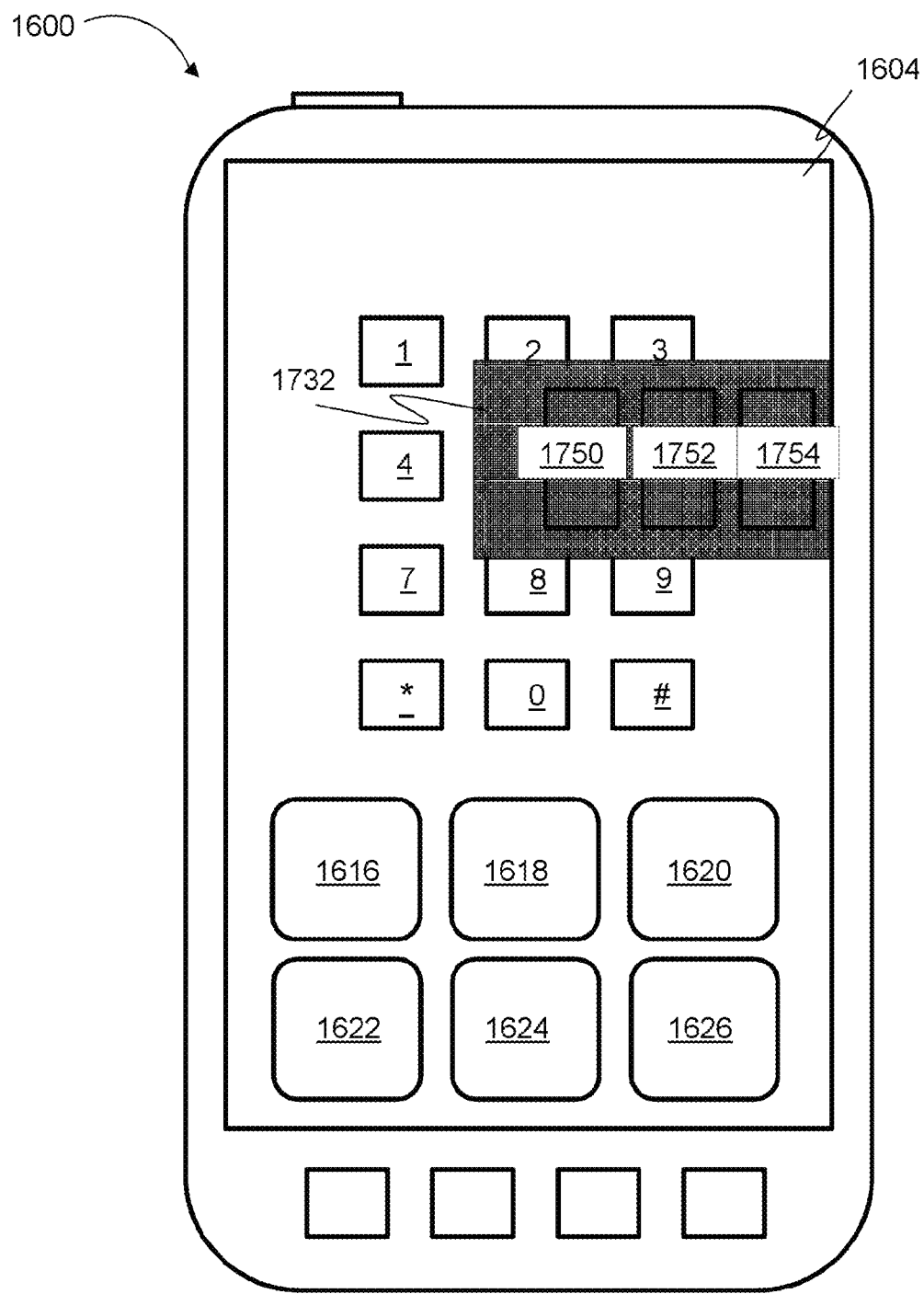
FIG. 17 shows a block diagram of a user device according to embodiments.

FIG. 17 shows a front view of user device 1600 according to embodiments. In these embodiments, overlay portion 1732 may comprise several touch-sensitive screen regions 1750, 1752 and 1754 which are operable to initiate one or more communication session transfer operations independently of the in-call screen application in response to user input via touch-sensitive screen regions 1750, 1752, 1754. This means that user input via any of touch-sensitive screen regions 1750, 1752, 1754 will not be passed to the in-call screen application displaying the in-call screen below the overlay portion, but rather will lead to transmittal of an appropriate communication session transfer request from user device 1600 to call control system 106.

In embodiments, button 1750 includes the text 'switch to cc1' (not shown) indicating to the user that selecting this button will allow them to switch to a communication client number 1. In embodiments, button 1752 includes the text 'switch to cc2' (not shown) indicating to the user that selecting this button will allow them to switch to a communication client number 2. In embodiments, button 1754 includes the text 'switch to cc3' (not shown) indicating to the user that selecting this button will allow them to switch to a communication client number 3.

In embodiments, configuring of the user interface may comprise configuring one or more touch-sensitive screen regions which are operable to receive user input in the form of a sliding action in a given direction over an overlay portion, for example overlaid over an in-call screen display, beginning at one of the touch-sensitive screen regions.

In embodiments, call control system 106 receives availability information from one or more communication clients and/or devices associated with a user and stores the received availability information in database 180.

In embodiments, call control system 106 retrieves availability information from database 180 which is indicative of which communication clients in the plurality of communication clients associated with the user are currently available for transfer of a communication session and transmits the retrieved availability information to one or more user devices associated with the user.

When availability information is received at a user device associated with the user, the user device is aware of which communication clients in the plurality are currently available for transfer of a communication session, including communication clients on other devices associated with the user. A user device can thus configure its user interface on the basis of the received availability information.

In embodiments, a user device configures its user interface to display only communication session transfer options associated with communication clients which are currently available. This helps a user to avoid attempting to transfer a communication session to a communication session which is currently unavailable.

In embodiments, a user device configures its user interface to display available communication clients in a different display mode from configuration for an unavailable communication client. For example, unavailable communication clients may still be presented as communication session transfer options, but displayed as 'grayed-out' communication session transfer options.

In embodiments, call control system 106 transmits a command to a user device associated with a user to configure itself into an auto-answer mode in relation to an initiated communication session transfer. Such embodiments allow a communication session to be transferred to a different communication client without the need for receipt of further user input from the user such as selection of an 'accept transfer' button on a user interface of the user device.

In embodiments, a command transmitted to a user device instructing the user device to configure itself into an auto-answer mode may comprise an identifier for a communication client on the device which is to enter an auto-answer mode in relation to the initiated communication session transfer. Such embodiments allow a communication session to be transferred to a particular communication client without the need for receipt of further user input from the user.

In embodiments, configuring the user interface on a user device may comprise displaying a set of one or more communication clients associated with the user via which communication sessions are currently may be conducted. A user can therefore keep track of communication sessions, including multiple concurrent communication sessions which are may be conducted via their communication clients.

Embodiments comprise receiving, during the established communication session, a communication session setup request associated with setup of a further communication session. In such embodiments, the displayed at least one communication session transfer option may comprise an option to initiate transfer of the further communication session to one or more communication clients associated with the user via which communication sessions are not currently being conducted. A user can thus choose a communication client to transfer the further communication session to.

Embodiments comprise receiving, during the established communication session, a communication session setup request associated with setup of a further communication session. In such embodiments, the displayed at least one communication session transfer option may comprise an option to initiate transfer of the established communication session to one or more communication clients associated with the user via which communication sessions are not currently being conducted. A user can thus choose a communication client to transfer the established communication session to.

Such embodiments could be useful for example if a user is conducting a call say on his home phone with remote party 1 and receives a further incoming call from a remote party 2 (say his mother-in-law). The user can see from the display configured on his home phone that his tablet user device is not currently being used for conducting a communication session and decides to transfer the further incoming call to his tablet user device. Another user (for example the user's wife) can then take the further incoming call from remote party 2 (her mother) on the tablet user device.

Alternatively, the user can decide to transfer the further incoming call from remote party 2 to his home phone and talk to remote party 2 himself and transfer the current call to his tablet user device where his wife or another family member can talk to remote party 1.

In embodiments, configuring the user interface on a user device may comprise displaying a set of one or more communication clients associated with the user via which communication sessions are currently being conducted on a non-telephony user device such as a PC. In such embodiments, at least one communication session transfer option may be configured on the non-telephony user device. Such embodiments could for example be useful to allow a secretary to monitor calls that her boss is conducting and transfer calls between his various devices on his behalf.

Embodiments comprise transferring an established communication session in a telecommunications network, the communication session may be established between one of a plurality of communication clients associated with a user and a remote device associated with a remote party. Such embodiments comprise at a device associated with the user:
    maintaining a set of one or more communication session triggering conditions;
    in response to detecting that at least of the one or more communication session triggering conditions has occurred, transmitting, to a call control system located in the signaling path for the established communication session, a communication session transfer request, the transmitted communication session transfer request may be operable to instruct the call control system to initiate transfer of the established communication session from the one of the communication clients in the plurality to at least another communication client in the plurality.

In embodiments, the one or more triggering conditions comprise the availability of a predetermined wireless access point via a communication client in said plurality of communication clients associated with the user.

In embodiments, the one or more triggering conditions are configurable by the user.

The above embodiments are to be understood as illustrative examples. Further embodiments are envisaged.

Remote party device 126 has been described above as being provided with communication services via circuit-switched network 102. Remote party device 126 can equally be provided with communication services via one or more other networks, including cellular networks, non-cellular networks, IP networks, IP Multimedia Subsystem (IMS) networks, etc.

Any or all functions of processor 702 may be carried out by computer software and/or firmware, communication session transfer application software and/or the operating system of the user device.

In embodiments described above in relation to FIG. 1, telecommunications network 1 may comprise a circuit-switched telecommunications network part 102 and a packet-switched network part 104. Embodiments may equally apply in a telecommunications network 1 which may comprise only a circuit-switched telecommunications network part 102 or only a packet-switched network part 104. Similarly, embodiments may equally apply in a telecommunications network 1 which may comprise only a cellular part, only a PSTN part, only a packet-switched part, etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention. Certain embodiments are defined in the accompanying claims.

What is claimed is:

1. A method of transferring an established communication session in a telecommunications network, the method comprising:
    at a call control system, in response to initiation or establishment of a communication session between one of a plurality of communication clients associated with a user and a remote device associated with a remote party, transmitting, to a device associated with the user, a notification that a communication session is currently being conducted between the one communication client associated with the user and the remote device associated with the remote party, wherein the call control system is located in the signaling path for the established communication session;
    at the call control system, in response to transmittal of the notification, receiving, from the device associated with the user, a communication session transfer request, the communication session transfer request having been generated by and transmitted from the device associated with the user, wherein the one communication client is located on a further device associated with the user; and
    at the call control system, in response to receipt of the communication session transfer request from the device associated with the user, initiating transfer of the established communication session from the one communication client in the plurality of communication clients to another communication client in the plurality of communication clients, wherein the another communication client is located on the device associated with the user,
    the notification being conducted on the basis of a preconfigured data set, specific to the user, identifying one or more of the plurality of communication clients associated with the user.

2. The method of claim 1, comprising:
    maintaining a user database containing user entries for a plurality of users, each user entry comprising a set of identifiers for one or more communication clients associated with a respective user; and in response to receipt of the communication session transfer request, performing a lookup in the user database, the lookup identifying the at least another communication client in the plurality of communication clients associated with the user, wherein the transmittal of the communication session leg setup request to the at least another communication client is carried out in response to the lookup.

3. The method of claim 1, wherein the received communication session transfer request comprises an identifier for the at least another communication client, and wherein the transmittal of the communication session leg setup request to the at least another communication client is carried out in response to receipt of the identifier for the another communication client by the call control system.

4. The method of claim 1, wherein the initiating comprises transmitting a communication session leg setup request to the at least another communication client.

5. The method of claim 1, wherein the initiating comprises transmitting communication session leg setup requests to at least two communication clients in the plurality of communication clients associated with the user.

6. The method of claim 5, wherein the received communication session transfer request comprises an identifier for the user, and wherein the transmittal of the communication session leg setup requests to the at least two communication clients in the plurality of communication clients associated with the user is carried out in response to receipt of the identifier for the user by the call control system and lookup of the identifier for the user in a user database containing user entries for a plurality of users, each user entry comprising a set of identifiers for one or more communication clients associated with the respective user.

7. The method of claim 1, the method comprising:
receiving a communication session setup response from the at least another communication client;
establishing a communication session between the another communication client and the remote device; and
tearing down the communication session established between the one communication client and the remote device.

8. The method of claim 1, the method comprising:
receiving a communication session setup response from the another communication client;
establishing a communication session between the another communication client and the remote device; and
maintaining the communication session established between the one communication client and the remote device.

9. The method of claim 1, the method comprising:
receiving availability information from one or more communication clients and/or devices associated with the user; and
storing the received availability information in an availability database.

10. The method of claim 9, the method comprising retrieving from the availability database availability information indicative of which communication clients in the plurality of communication clients associated with the user are currently available for transfer of a communication session; and transmitting the retrieved availability information to the device.

11. The method of claim 1, wherein the one communication client and the another communication client are co-located on the device.

12. The method of claim 1, wherein the one communication client is located on the device and the another communication client is located on a further device associated with the user.

13. The method of claim 1, the method comprising transmitting a command to a device associated with the user to configure itself into an auto-answer mode in relation to the initiated communication session transfer.

14. The method of claim 13, wherein the command comprises an identifier for a communication client on the device which is to enter an auto-answer mode in relation to the initiated communication session transfer.

15. The method of claim 1, wherein a communication client comprises one or more of:
a cellular radio communication client,
a non-cellular radio communication client,
a Voice over Internet Protocol (VoIP) communication client, and
a Plain Old Telephone Service (POTS) communication client.

16. The method of claim 1, wherein at least two of the communication clients in the plurality of communication clients associated with the user are co-located on the device.

17. The method of claim 1, wherein at least two of the communication clients in the plurality of communication clients associated with the user are co-located on a further device associated with the user.

18. The method of claim 1, wherein the initiating comprises transmitting an instruction to the at least another communication client to activate an alert function which is distinctive for a communication session transfer scenario.

19. The method of claim 18, wherein the alert function comprises a distinctive ringing function.

20. The method of claim 18, wherein the alert function comprises a distinctive display function.

21. A system for use in transferring an established communication session in a telecommunications network, the system comprising:
at least one memory including computer program code; and
at least one processor in data communication with the at least one memory, wherein the at least one processor is configured to:
at a call control system, in response to initiation or establishment of a communication session between one of a plurality of communication clients associated with a user and a remote device associated with a remote party, transmit, to a device associated with the user, a notification that a communication session is currently being conducted between the one communication client associated with the user and the remote device associated with the remote party, wherein the call control system is located in the signalling path for the established communication session,
at the call control system, in response to transmittal of the notification, receive, from the device associated with the user, a communication session transfer request, the communication session transfer request having been generated by and transmitted from the device associated with the user, wherein the one communication client is located on a further device associated with the user; and at the call control system, in response to receipt of the communication session transfer request from the device associated with the user, initiate transfer of the established communication session from the one communication client in the plurality of communication clients to another communication client in the plurality of communication clients, wherein the another communication client is located on the device associated with the user, the notification being conducted on the basis of a preconfigured data set, specific to the user, identifying one or more of the plurality of communication clients associated with the user.

22. A non-transitory computer-readable storage medium comprising computer-executable instructions which, when executed by a processor, cause a computing device to perform a method of transferring an established communication session in a telecommunications network, the method comprising:

at a call control system, in response to initiation or establishment of a communication session between one of a plurality of communication clients associated with a user and a remote device associated with a remote party, transmitting, to a device associated with the user, a notification that a communication session is currently being conducted between the one communication client associated with the user and the remote device associated with the remote party, wherein the call control system is located in the signalling path for the established communication session;

at the call control system, in response to transmittal of the notification, receiving, from the device associated with the user, a communication session transfer request, the communication session transfer request having been generated by and transmitted from the device associated with the user, wherein the one communication client is located on a further device associated with the user; and at the call control system, in response to receipt of the communication session transfer request from the device associated with the user, initiating transfer of the established communication session from the one communication client in the plurality of communication clients to another communication client in the plurality of communication clients, wherein the another communication client is located on the device associated with the user, the notification being conducted on the basis of a preconfigured data set, specific to the user, identifying one or more of the plurality of communication clients associated with the user.

23. A method of transferring an established communication session in a telecommunications network, the method comprising:

at a device associated with a user, upon initiation or establishment of a communication session between one of a plurality of communication clients associated with the user and a remote device associated with a remote party, receiving, from a call control system located in the signaling path for the established communication session, a notification that a communication session is currently being conducted between the one communication client associated with the user and the remote device associated with the remote party;

at the device associated with the user, in response to receipt of the notification from the call control system, configuring a user interface on the device associated with the user to display at least one communication session transfer option to the user, wherein the one communication client is located on a further device associated with the user;

at the device associated with the user, receiving, via the user interface, user input indicating selection of the displayed at least one communication session transfer option by the user; and at the device associated with the user, transmitting, to the call control system, a communication session transfer request, the transmitted communication session transfer request being operable to instruct the call control system to initiate transfer of the established communication session from the one of the communication clients in the plurality to another communication client in the plurality, wherein the another communication client is located on the device associated with the user, the notification having been conducted on the basis of a preconfigured data set, specific to the user, identifying one or more of the plurality of communication clients associated with the user.

24. The method of claim 23, wherein at least two of the communication clients in the plurality are co-located on the device.

25. The method of claim 23, wherein at least two of the communication clients in the plurality are co-located on a further device associated with the user.

26. The method of claim 23, wherein the at least one displayed communication session transfer option comprises an identifier for the another communication client in the plurality.

27. The method of claim 23, wherein the at least one displayed communication session transfer option comprises a set of one or more identifiers for communication clients in the plurality and the selection comprises selection by the user of an identifier for the another communication client in the plurality from the set.

28. The method of claim 23, the method comprising at the device associated with the user:

maintaining a set of identifiers for one or more communication clients associated with the user; and inserting into the transmitted communication session transfer request at least one identifier from the set.

29. The method of claim 23, wherein the instructing of the call control system to initiate transfer of the established communication session comprises instructing the call control system to initiate setup of a communication session leg to the another communication client.

30. The method of claim 29, wherein the transmitted communication session transfer request comprises an identifier for the another communication client, and wherein initiating the setup is carried out in response to receipt of the identifier for the another communication client by the call control system.

31. The method of claim 23, wherein the instructing of the call control system to initiate transfer of the established communication session comprises instructing the call control system to initiate setup of communication session legs to a plurality of communication clients associated with the user.

32. The method of claim 31, wherein the transmitted communication session transfer request comprises an identifier for the user, and wherein initiating the setup is carried in response to receipt of the identifier for the user by the call control system.

33. The method of claim 23, the method comprising receiving, from the call control system, availability information indicative of which communication clients in the plurality are currently available for transfer of a communication session,
  wherein the configuring is carried out on the basis of the received availability information.

34. The method of claim 33, wherein configuration for an available communication client is carried out in a different display mode from configuration for an unavailable communication client.

35. The method of claim 23, wherein the one communication client and the another communication client are co-located on the device.

36. The method of claim 35, wherein the displayed at least one transfer option comprises an option to push the communication session established on the one communication client on the device to the another communication client on the device.

37. The method of claim 35, wherein the displayed at least one transfer option comprises an option to pull the communication session established on the one communication client on the device from another communication client on the device.

38. The method of claim 23, wherein the one communication client is located on the device and the another communication client is located on a further device associated with the user.

39. The method of claim 38, wherein the at least one transfer option comprises an option to push the communication session established on the one communication client on the device to another communication client on the further communication device.

40. The method of claim 23, wherein the another communication client is located on the device and the one communication client is located on a further device associated with the user.

41. The method of claim 40, wherein the at least one transfer option comprises an option to pull the communication session established on the one communication client on the device to another communication client on the further communication device.

42. The method of claim 23, the method comprising configuring the device into an auto-answer mode in relation to the initiated communication session transfer.

43. The method of claim 23, wherein the user interface comprises a touch-screen user interface and the configuring of the user interface comprises configuring one or more touch-sensitive screen regions which are operable to receive the selection input from the user.

44. The method of claim 43, wherein the one or more touch-sensitive screen regions are configured as an overlay portion over at least a part of a screen displayed by the device.

45. The method of claim 44, wherein the configuring of the user interface comprises configuring one or more touch-sensitive screen regions which are operable to receive user input in the form of a sliding action in a given direction over the overlay portion beginning at one of the touch-sensitive screen regions.

46. The method of claim 44, wherein the screen displayed by the device comprises an in-call screen.

47. The method of claim 23, wherein one or more of the identifiers for the another communication client and/or the one or more identifiers in the set are user-configurable.

48. The method of claim 23, wherein a communication client comprises one or more of:
  a cellular radio communication client,
  a non-cellular radio communication client,
  a Voice over Internet Protocol (VoIP) communication client, and
  a Plain Old Telephone Service (POTS) communication client.

49. The method of claim 23, the method comprising configuring the user interface on the device to display a set of one or more communication clients associated with the user via which communication sessions are currently being conducted.

50. The method of claim 49, the method comprising;
  receiving, during the established communication session, a communication session setup request associated with setup of a further communication session,
  wherein said displayed at least one communication session transfer option comprises an option to initiate transfer of said further communication session to one or more communication clients associated with the user via which communication sessions are not currently being conducted.

51. The method of claim 49, the method comprising;
  receiving, during the established communication session, a communication session setup request associated with setup of a further communication session,
  wherein said displayed at least one communication session transfer option comprises an option to initiate transfer of said established communication session to one or more communication clients associated with the user via which communication sessions are not currently being conducted.

52. A system for use in transferring an established communication session in a telecommunications network, the system comprising:
  at least one memory including computer program code; and
  at least one processor in data communication with the at least one memory, wherein the at least one processor is configured to:
  at a device associated with a user, upon initiation or establishment of a communication session between one of a plurality of communication clients associated with the user and a remote device associated with a remote party, receive, from a call control system located in the signaling path for the established communication session, a notification that a communication session is currently being conducted between the one communication client associated with the user and the remote device associated with the remote party;
  at the device associated with the user, in response to receipt of the notification from the call control system, configure a user interface on the device associated with the user to display at least one communication session transfer option to the user, wherein the one communication client is located on a further device associated with the user;
  at the device associated with the user, receive, via the user interface, user input indicating selection of the displayed at least one communication session transfer option by the user; and
  at the device associated with the user, transmit, to the call control system, a communication session transfer request, the transmitted communication session transfer request being operable to instruct the call control system to initiate transfer of the established communication session from the one of the communication clients in the plurality to another communication client in the plurality, wherein the another communication client is located on the device associated with the user, the notification having been conducted on the basis of a preconfigured data set, specific to the user, identifying one or more of the plurality of communication clients associated with the user.

53. A non-transitory computer-readable storage medium comprising computer-executable instructions which, when executed by a processor, cause a computing device to perform a method of transferring an established communication session in a telecommunications network, the method comprising:
- at a device associated with a user, upon initiation or establishment of a communication session between one of a plurality of communication clients associated with the user and a remote device associated with a remote party, receiving, from a call control system located in the signaling path for the established communication session, a notification that a communication session is currently being conducted between the one communication client associated with the user and the remote device associated with the remote party;
- at the device associated with the user, in response to receipt of the notification from the call control system, configuring a user interface on the device associated with the user to display at least one communication session transfer option to the user, wherein the one communication client is located on a further device associated with the user;
- at the device associated with the user, receiving, via the user interface, user input indicating selection of the displayed at least one communication session transfer option by the user; and
- at the device associated with the user, transmitting, to the call control system, a communication session transfer request, the transmitted communication session transfer request being operable to instruct the call control system to initiate transfer of the established communication session from the one of the communication clients in the plurality to another communication client in the plurality, wherein the another communication client is located on the device associated with the user, the notification having been conducted on the basis of a preconfigured data set, specific to the user, identifying one or more of the plurality of communication clients associated with the user.

54. A method of transferring an established communication session in a telecommunications network, the method comprising:
- at a device associated with a user, maintaining a set of one or more communication session triggering conditions, the communication session being established between one of a plurality of communication clients associated with the user and a remote device associated with a remote party, wherein the one or more triggering conditions comprises the availability of a predetermined wireless access point via a communication client in said plurality of communication clients associated with the user;
- at the device associated with the user, in response to detecting that at least of the one or more communication session triggering conditions has occurred, transmitting, to a call control system located in the signalling path for the established communication session, a communication session transfer request, the transmitted communication session transfer request being operable to instruct the call control system to initiate transfer of the established communication session from the one of the communication clients in the plurality to another communication client in the plurality,
- the transfer being conducted on the basis of a preconfigured data set, specific to the user, identifying one or more of the plurality of communication clients associated with the user.

55. The method of claim 54, wherein the one or more triggering conditions are configurable by the user.

56. The method of claim 1, wherein the communication session transfer request does not compromise in-band transmittal of tones.

57. The method of claim 23, wherein the communication session transfer request does not compromise in-band transmittal of tones.

* * * * *